US008273822B2

(12) United States Patent
Rossi et al.

(10) Patent No.: US 8,273,822 B2
(45) Date of Patent: Sep. 25, 2012

(54) REVERSIBLE THERMOCHROMIC COMPOSITIONS

(75) Inventors: Mirko Rossi, San Lazzaro di Savena (IT); Graziano Zagnoni, Vergato (IT); Manuele Vitali, Bologna (IT); Dario Lazzari, Bologna (IT); Walter Fischer, Reinach (CH)

(73) Assignee: BASF SE, Ludwigshafen (DE)

( * ) Notice: Subject to any disclaimer, the term of this patent is extended or adjusted under 35 U.S.C. 154(b) by 389 days.

(21) Appl. No.: 12/223,235

(22) PCT Filed: Jan. 25, 2007

(86) PCT No.: PCT/EP2007/050744
§ 371 (c)(1),
(2), (4) Date: Jul. 25, 2008

(87) PCT Pub. No.: WO2007/085636
PCT Pub. Date: Aug. 2, 2007

(65) Prior Publication Data
US 2010/0234522 A1 Sep. 16, 2010

(30) Foreign Application Priority Data

Jan. 30, 2006 (EP) .................................... 06101009

(51) Int. Cl.
*C08L 49/00* (2006.01)
*G11B 7/24* (2006.01)
*G02B 5/23* (2006.01)

(52) U.S. Cl. .................. 524/550; 106/31.18; 106/31.21; 252/566; 252/600; 524/324

(58) Field of Classification Search .................. 252/602, 252/600, 586; 548/418; 549/234; 552/201; 524/550, 324; 106/31.18, 31.21
See application file for complete search history.

(56) References Cited

U.S. PATENT DOCUMENTS

| 4,028,118 A | 6/1977 | Nakasuji et al. ................ 106/21 |
| 6,770,125 B2 * | 8/2004 | Chen et al. ................. 106/31.18 |

FOREIGN PATENT DOCUMENTS

| EP | 1179435 | 2/2002 |
| KR | 2003-0016589 | * 3/2003 |

OTHER PUBLICATIONS

G. Began et al., J. Agric. Food Chem. (1999), vol. 47, pp. 4992-4997.
S. N. Guha et al., Radiat. Phys. Chem. (1997), vol. 49, No. 1, pp. 43-46.
A. Sundaryono et al., Journal of Molecular Structure, (2003), vol. 649, pp. 177-190.

* cited by examiner

*Primary Examiner* — Bijan Ahvaz
(74) *Attorney, Agent, or Firm* — Tyler A. Stevenson

(57) ABSTRACT

The present invention pertains to a reversible thermochromic system comprising a β-phenylvinylketone or a ω-phenyl polyacetylenyl ketone with at least one acidic hydrogen and a base and to a reversible thermochromic composition comprising the reversible thermochromic system and a carrier material and to novel substituted β-phenylvinylketones or ω-phenyl polyacetylenyl ketones with at least one acidic hydrogen.

10 Claims, No Drawings

REVERSIBLE THERMOCHROMIC COMPOSITIONS

The present invention pertains to a reversible thermochromic system comprising a β-phenylvinylketone or a ω-phenyl polyacetylenyl ketone with at least one acidic hydrogen and a base and to a reversible thermochromic composition comprising the reversible thermochromic system and a carrier material and to novel substituted β-phenylvinylketones or ω-phenyl polyacetylenyl ketones with at least one acidic hydrogen.

KR-A-2003-016,589 describes a reversible heat-discoloring composition and a mirror against eye-dazzling using the same. EP-A-1,179,435 discloses a reversible thermochromic composition. G. Began et al. describe in J. Agric. Food Chem. 1999, 47, 4992-4997 the interaction of curcumin with phosphatidylcholine. Thermochromic materials are also disclosed in U.S. Pat. No. 4,028,118. S, N. Guha et al. describe in Radiat. Phys. Chem. 1997, 49, 43-44 a curcuminoid antioxidant. Synthesis and complexation properties of two curcuminoid molecules bearing a diphenylmethane linkage are disclosed by A. Sundaryono et al. in Journal of Molecular Structure 2003, 649, 177-190.

Known reversible organic thermochromic systems consist of a basic color former such as a leuco dye and an acidic developer such as a phenolic compound. In cold, these components are a dark colored salt and upon heating they dissociate above a certain temperature. On cooling the dark colored salt forms again. The major drawbacks are the poor photostability of the basic color former and the acidic developer and the color change may be retarded and such systems have a reduced thermal stability which is a disadvantage in plastic articles prepared by extrusion.

The system according to this invention does not have these disadvantages as the used compounds may have a greater photostability and less or no retarding of the color change. For instance, the color change is fully reversible and there is essentially no fatigue after many hot-cold cycles. The system or compound according to this invention change color upon heating and turn back to the original color upon cooling. In a cool surrounding, the color is for example red or orange which turns upon heating for example to orange or yellow. So at cold temperature the system or compound is in one chemical form and upon heating the system or compound changes color and is in another chemical form. In the instant case one form can be a β-phenylvinylketone or a ω-phenyl polyacetylenyl ketone with at least one acidic hydrogen (e.g. a compound of formula (I) as defined below) and a base and the other form can be a compound of formula (II)-(VI) or one of the tautomers thereof. β-phenylvinylketones and ω-phenyl polyacetylenyl ketones with at least one acidic hydrogen are thermally quite stable so they can be extruded at high temperatures which is required for incorporation into common thermoplastic polymers.

The present invention pertains to a reversible thermochromic system comprising
(a) a β-phenylvinylketone or a ω-phenyl polyacetylenyl ketone containing at least one acidic hydrogen and
(b) a base;
with the proviso that the system is essentially free of thymol blue (thymolsulfonephthalein), in particular essentially free of a phthalein derivative.

The β-phenylvinylketone or ω-phenyl polyacetylenyl ketone can be unsubstituted or substituted.

Of interest is a reversible thermochromic system, wherein component (a) is a compound of formula (I),

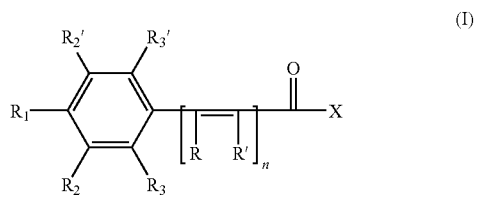

wherein
X is

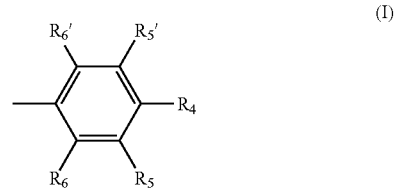

or $CHR_7$—$CO$—$R_8$; or X is $C_1$-$C_{30}$alkyl, $C_2$-$C_{30}$alkenyl, $C_2$-$C_{30}$alkinyl, $C_7$-$C_{12}$aryl, $C_7$-$C_{12}$aralkynyl, $C_8$-$C_{12}$aralkenyl, $C_8$-$C_{12}$aralkynyl, each of which is unsubstituted or substituted;

n is an integer from 1 to 10;

R and R' are independently hydrogen, $C_1$-$C_{30}$alkyl, $C_2$-$C_{30}$alkenyl, $C_2$-$C_{30}$alkynyl, $C_6$-$C_{12}$aryl, $C_7$-$C_{12}$aralkyl, $C_8$-$C_{12}$aralkenyl or $C_8$-$C_{12}$aralkynyl;

$R_1$, $R_2$, $R_2'$, $R_3$, $R_3'$, $R_4$, $R_5$, $R_5'$, $R_6$ and $R_6'$ are independently hydrogen, hydroxy, $C_1$-$C_{30}$alkyl, $C_2$-$C_{30}$alkenyl, $C_2$-$C_{30}$alkynyl, $C_6$-$C_{12}$aryl, $C_7$-$C_{12}$aralkyl, $C_8$-$C_{12}$aralkenyl, $C_8$-$C_{12}$aralkynyl, halogen, $NO_2$, CN, $NR_9R_{10}$, $OR_{11}$, $SR_{11}$, $S(=O)R_{11}$, $S(=O)_2R_{11}$, $CO$—$R_{11}$, $CO$—$O$—$R_{11}$, $O$—$CO$—$R_{11}$, $CO$—$NR_9R_{10}$ or $NR_9$—$CO$—$R_{11}$, whereby the alkyl, alkenyl, alkynyl, aryl, aralkyl, aralkenyl and aralkynyl are substituted or unsubstituted;

$R_7$, $R_9$ and $R_{10}$ are independently H or as defined for $R_8$;

$R_8$ and $R_{11}$ are independently $C_1$-$C_{30}$alkyl, $C_2$-$C_{30}$alkenyl, $C_2$-$C_{30}$alkynyl, $C_6$-$C_{10}$aryl, $C_7$-$C_{12}$aralkyl, $C_8$-$C_{12}$aralkenyl, $C_8$-$C_{12}$aralkynyl, whereby the alkyl, alkenyl, alkynyl, aryl, aralkyl, aralkenyl and aralkynyl are substituted or unsubstituted;

the substituted alkyl, alkenyl, alkynyl, aryl, aralkyl, aralkenyl and aralkynyl are substituted by halogen, hydroxy, $NO_2$, CN, $CO$—$R_{12}$, $COO$—$R_{12}$, $CONR_{13}R_{14}$, $OCO$—$R_{12}$, $NR_{13}CO$—$R_{12}$, $NR_{13}R_{14}$, $O$—$R_{12}$, $S$—$R_{12}$, $S(=O)$—$R_{12}$ and/or $S(=O)_2$—$R_{12}$; or the substituted aryl, aralkyl, aralkenyl and aralkynyl are substituted by $C_1$-$C_{30}$alkyl, $C_2$-$C_{30}$alkenyl and/or $C_2$-$C_{30}$alkynyl;

$R_{12}$ is independently $C_1$-$C_{30}$-alkyl, $C_2$-$C_{30}$alkenyl, $C_2$-$C_{30}$alkynyl, $C_6$-$C_{12}$aryl, $C_7$-$C_{12}$aralkyl, $C_8$-$C_{12}$aralkenyl or $C_8$-$C_{12}$aralkynyl;

$R_{13}$ and $R_{14}$ are independently H or as defined for $R_{12}$;

with the proviso that either at least one of $R_1$, $R_3$, $R_3'$, $R_4$, $R_6$ and $R_6'$ is hydroxy; or X is $CHR_7$—$CO$—$R_8$; or at least one of $R_1$, $R_3$, $R_3'$, $R_4$, $R_6$ and $R_6'$ is hydroxy and X is $CHR_7$—$CO$—$R_8$.

Of particular interest is a reversible thermochromic system, wherein
X is

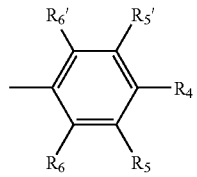

or CHR$_7$—CO—R$_8$; or X is C$_1$-C$_{30}$alkyl, C$_2$-C$_{30}$alkenyl, C$_2$-C$_{30}$alkinyl, C$_7$-C$_{12}$aryl, C$_7$-C$_{12}$aralkyl, C$_8$-C$_{12}$aralkenyl, C$_8$-C$_{12}$aralkynyl, each of which is unsubstituted or substituted;

n is an integer from 1 to 2;

R and R' are independently hydrogen or C$_1$-C$_{30}$alkyl;

R$_1$, R$_2$, R$_2$', R$_3$, R$_3$', R$_4$, R$_5$, R$_5$', R$_6$ and R$_6$' are independently hydrogen, hydroxy, C$_1$-C$_{30}$alkyl, C$_2$-C$_{30}$alkenyl, C$_2$-C$_{30}$alkynyl, C$_6$-C$_{12}$aryl, C$_7$-C$_{12}$aralkyl, C$_8$-C$_{12}$aralkenyl, C$_8$-C$_{12}$aralkynyl, halogen, NO$_2$, NR$_9$R$_{10}$, OR$_{11}$, CO—R$_{11}$, CO—O—R$_{11}$, O—CO—R$_{11}$, CO—NR$_9$R$_{10}$ or NR$_9$—CO—R$_{11}$, whereby the alkyl, alkenyl, alkynyl, aryl, aralkyl, aralkenyl and aralkynyl are substituted or unsubstituted;

R$_7$, R$_9$ and R$_{10}$ are independently H or as defined for R$_8$;

R$_8$ and R$_{11}$ are independently C$_1$-C$_{30}$alkyl, C$_2$-C$_{30}$alkenyl, C$_2$-C$_{30}$alkynyl, C$_6$-C$_{10}$aryl, C$_7$-C$_{12}$aralkyl, C$_8$-C$_{12}$aralkenyl, C$_8$-C$_{12}$aralkynyl, whereby the alkyl, alkenyl, alkynyl, aryl, aralkyl, aralkenyl and aralkynyl are substituted or unsubstituted;

the substituted alkyl, alkenyl, alkynyl, aryl, aralkyl, aralkenyl and aralkynyl are substituted by halogen, hydroxy, NO$_2$, CO—R$_{12}$, COO—R$_{12}$, CONR$_{13}$R$_{14}$, OCO—R$_{12}$, NR$_{13}$CO—R$_{12}$, NR$_{13}$R$_{14}$ and/or O—R$_{12}$; or the substituted aryl, aralkyl, aralkenyl and aralkynyl are substituted by C$_1$-C$_{30}$alkyl, C$_2$-C$_{30}$alkenyl and/or C$_2$-C$_{30}$alkynyl;

R$_{12}$ is independently C$_1$-C$_{30}$-alkyl, C$_2$-C$_{30}$alkenyl, C$_2$-C$_{30}$alkynyl, C$_6$-C$_{12}$aryl, C$_7$-C$_{12}$aralkyl, C$_8$-C$_{12}$aralkenyl or C$_8$-C$_{12}$aralkynyl;

R$_{13}$ and R$_{14}$ are independently H or as defined for R$_{12}$.

Of special interest is a reversible thermochromic system, wherein
X is

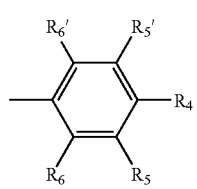

or CHR$_7$—CO—R$_8$; or X is C$_1$-C$_{30}$alkyl, C$_2$-C$_{30}$alkenyl, C$_7$-C$_{12}$aryl, C$_7$-C$_{12}$aralkyl, C$_8$-C$_{12}$aralkenyl, each of which is unsubstituted or substituted;

n is 1;

R and R' are hydrogen;

R$_1$, R$_2$, R$_2$', R$_3$, R$_3$', R$_4$, R$_5$, R$_5$', R$_6$ and R$_6$' are independently hydrogen, hydroxy, C$_1$-C$_{30}$alkyl, C$_2$-C$_{30}$alkenyl, C$_7$-C$_{12}$aralkyl, C$_8$-C$_{12}$aralkenyl, halogen, NO$_2$, NR$_9$R$_{10}$, OR$_{11}$, CO—R$_{11}$, CO-β—R$_{11}$, O—CO—R$_{11}$, whereby the alkyl, alkenyl, aralkyl and aralkenyl are substituted or unsubstituted;

R$_7$ is H;

R$_9$ and R$_{10}$ are independently H or as defined for R$_8$;

R$_8$ and R$_{11}$ are independently C$_1$-C$_{30}$alkyl, C$_2$-C$_{30}$alkenyl, C$_7$-C$_{12}$aralkyl, C$_8$-C$_{12}$aralkenyl, whereby the alkyl, alkenyl, aralkyl and aralkenyl are substituted or unsubstituted;

the substituted alkyl, alkenyl, aryl, aralkyl and aralkenyl are substituted by halogen, hydroxy, NO$_2$, CO—R$_{12}$, COO—R$_{12}$, OCO—R$_{12}$, NR$_{13}$R$_{14}$ and/or O—R$_{12}$; or the substituted aryl, aralkyl, aralkenyl and aralkynyl are substituted by C$_1$-C$_{30}$alkyl, C$_2$-C$_{30}$alkenyl and/or C$_2$-C$_{30}$alkynyl;

R$_{12}$ is independently C$_1$-C$_{30}$alkyl, C$_2$-C$_{30}$alkenyl, C$_7$-C$_{12}$aralkyl, C$_8$-C$_{12}$aralkenyl;

R$_{13}$ and R$_{14}$ are independently H or as defined for R$_{12}$.

Of further particular interest is a reversible thermochromic system, wherein
X is

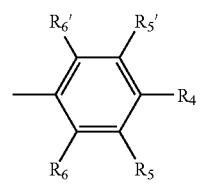

or CHR$_7$—CO—R$_8$; or X is C$_1$-C$_{30}$alkyl, C$_7$-C$_{12}$aryl or C$_8$-C$_{12}$aralkenyl, each of which is unsubstituted or substituted;

n is 1;

R and R' are hydrogen;

R$_1$, R$_2$, R$_2$', R$_3$, R$_3$', R$_4$, R$_5$, R$_5$', R$_6$ and R$_6$' are independently hydrogen, hydroxy, halogen, NO$_2$, NR$_9$R$_{10}$, OR$_{11}$ or CO—R$_{11}$;

R$_7$ is H;

R$_9$ and R$_{10}$ are independently H or as defined for R$_8$;

R$_8$ and R$_{11}$ are independently C$_1$-C$_{30}$alkyl or C$_8$-C$_{12}$aralkenyl, whereby the alkyl and aralkenyl are substituted or unsubstituted;

the substituted alkyl, aryl and aralkenyl are substituted by hydroxy, NO$_2$ and/or O—R$_{12}$;

R$_{12}$ is C$_1$-C$_{30}$alkyl.

Of further special interest is a reversible thermochromic system, wherein
X is

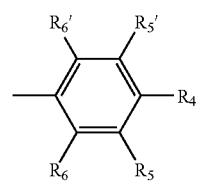

or CHR$_7$—CO—R$_8$; or X is C$_6$-C$_{10}$alkyl, C$_{12}$aryl or C$_8$-C$_{10}$aralkenyl, each of which is unsubstituted or substituted;

n is 1;

R and R' are hydrogen;

R$_1$, R$_2$, R$_2$', R$_3$, R$_3$', R$_4$, R$_5$, R$_5$', R$_6$ and R$_6$' are independently hydrogen, hydroxy, halogen, NO$_2$, NR$_9$R$_{10}$, OR$_{11}$ or CO—R$_{11}$;

R$_7$ is H;

R$_9$ and R$_{10}$ are independently H or as defined for R$_8$;

$R_8$ and $R_{11}$ are independently $C_1$-$C_{10}$alkyl or $C_8$-$C_{10}$aralkenyl, whereby the alkyl and aralkenyl are substituted or unsubstituted;

the substituted alkyl, aryl and aralkenyl are substituted by hydroxy, $NO_2$ and/or O—$R_{12}$;

$R_{12}$ is $C_1$-$C_{10}$alkyl.

Of most particular interest is a reversible thermochromic system, wherein
X is

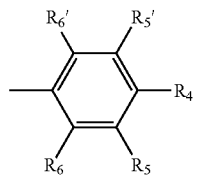

or $CHR_7$—CO—$R_8$; or X is $C_1$-$C_5$alkyl or naphthyl; or X is substituted $C_8$aralkenyl;

n is 1;

R and R' are hydrogen;

$R_1$, $R_2$, $R_2'$, $R_3$, $R_3'$, $R_4$, $R_5$, $R_5'$, $R_6$ and $R_6'$ are independently hydrogen, hydroxy, halogen, $NO_2$, $NR_9R_{10}$, $OR_{11}$ or CO—$R_{11}$;

$R_7$ is H;

$R_9$ and $R_{10}$ are independently H or as defined for $R_8$;

$R_8$ and $R_{11}$ are independently $C_1$-$C_5$alkyl or $C_8$aralkenyl, whereby the alkyl and aralkenyl are substituted or unsubstituted;

the substituted alkyl, aryl and aralkenyl are substituted by hydroxy, $NO_2$ and/or O—$R_{12}$;

$R_{12}$ is $C_1$-$C_5$alkyl.

Of utmost interest is a reversible thermochromic system, wherein
X is

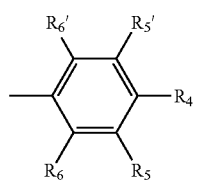

or $CHR_7$—CO—$R_8$; or X is methyl or naphthyl; or X is substituted $C_8$aralkenyl;

n is 1;

R and R' are hydrogen;

$R_1$, $R_2$, $R_2'$, $R_4$, $R_5$ and $R_5'$ are independently hydrogen, hydroxy, chlorine, $NO_2$, $NR_9R_{10}$, $OR_{11}$ or CO—$R_{11}$;

$R_3$, $R_3'$, $R_6$ and $R_6'$ are hydrogen;

$R_7$ is H;

$R_9$ and $R_{10}$ are independently as defined for $R_8$;

$R_8$ and $R_{11}$ are independently methyl or substituted $C_8$aralkenyl;

the substituted aralkenyl is substituted by hydroxy, $NO_2$ and/or O—$R_{12}$;

$R_{12}$ is methyl.

For instance, $R_3$, $R_3'$, $R_6$ and $R_6'$ are H.
For example, either $R_2$ or $R_2'$ is H.
For instance, either $R_5$ or $R_5'$ are H.
Preferably, R and R' are hydrogen.
Preference is given to n being 1.
$R_1$ and/or $R_4$ preferably are hydroxy.

Preference is given to a reversible thermochromic system, wherein the base (b) has a molecular weight of at least 150 g per mole, especially at least 300 g per mole, in particular at least 350 g per mole.

Also particular preference is given to a reversible thermochromic system, wherein the base (b) is an secondary or tertiary amine or a secondary or tertiary phosphine, whereby said amine and said phosphine are not aromatic and do not have aromatic substituents that are directly connected to said amine or said phosphine.

The secondary or tertiary amine or the secondary or tertiary phosphine has two or three organic substituents.

For instance, the amine or phosphine is monofunctional (i.e. contains one amine or phosphine group per molecule) or polyfunctional (i.e. contains at least two amine or phosphine groups per molecule), in particular polyfunctional.

For example, the secondary amine is $NHR_{26}R_{27}$, the tertiary amine is $NR_{26}R_{27}R_{28}$, the secondary phosphine is $PHR_{26}R_{27}$ and the tertiary phosphine is $PR_{26}R_{27}R_{28}$, wherein $R_{26}$, $R_{27}$ and $R_{28}$ are independently an organic residue containing 1-500 carbon atoms or an organic residue containing 1-500 carbon atoms and 1-200 heteroatoms, in particular N, P, O, S, Se, Cl, Br and/or I; or $R_{26}$ and $R_{27}$ form together with the N they are connected to an unsubstituted or substituted 5- or 6-membered cyclic ring structure, preferably an unsubstituted or substituted 6-membered cyclic ring structure; for instance, such an unsubstituted or substituted cyclic ring structure is a sterically hindered amine. Of interest is a secondary or tertiary amine or a secondary or tertiary phosphine that does not contain acidic groups such as COOH and $SO_2OH$.

For instance, $R_{26}$, $R_{27}$ and $R_{28}$ are independently $C_1$-$C_{30}$alkyl, $C_7$-$C_{12}$aralkyl, $C_2$-$C_{30}$alkenyl, $C_8$-$C_{12}$aralkenyl, $C_2$-$C_{30}$alkynyl or $C_8$-$C_{12}$aralkynyl, the said groups are unsubstituted or substituted by one or more COO—$R_{13}$, $CONR_{13}R_{14}$, OCO—$R_{12}$, $NR_{13}CO$—$R_{12}$, $NR_{12}R_{13}$, O—$R_{12}$, S—$R_{12}$, SO—$R_{12}$ and/or $S(=O)_2$—$R_{12}$; or the aralkyl, aralkenyl and aralkynyl are substituted by $C_1$-$C_{30}$alkyl, $C_2$-$C_{30}$alkenyl and/or $C_2$-$C_{30}$alkynyl; or the said amine is a sterically hindered amine; $R_{12}$, $R_{13}$ and $R_{14}$ are as defined above.

Most particular preference is given to a reversible thermochromic system, wherein the base b is a secondary or tertiary amine, for instance a secondary amine, for example a secondary or tertiary sterically hindered amine such as a secondary sterically hindered amine.

The secondary or tertiary sterically hindered amine is preferably a compound of formula (Z)

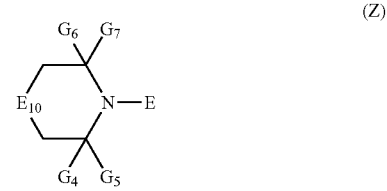

(Z)

wherein $G_4$, $G_5$, $G_6$ and $G_7$ are independently methyl or ethyl, for example methyl;

E is hydrogen, $C_1$-$C_{18}$alkyl or $C_3$-$C_{18}$alkenyl, for example $C_1$-$C_{18}$alkyl or hydrogen, in particular hydrogen;

$E_{10}$ is a carbon atom which is unsubstituted or substituted by OH, =O or by one or two organic residues containing in total 1-500 carbon atoms or 1-500 carbon atoms and 1-200 heteroatoms, in particular N, P, O, S, Se, Cl, Br and/or I.

The secondary or tertiary sterically hindered amine is preferably one of formulae (A) to (M)
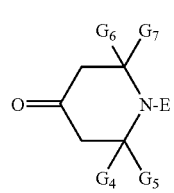 (A)
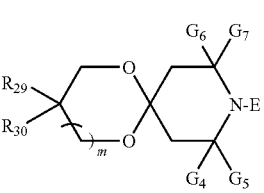 (B)
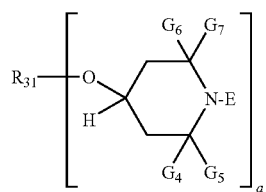 (C)
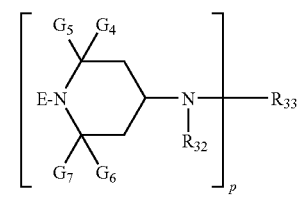 (D)
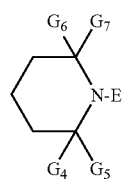 (E)
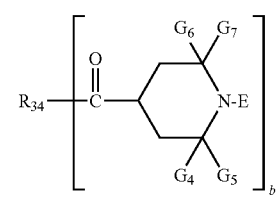 (F)
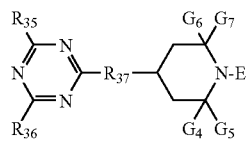 (G)
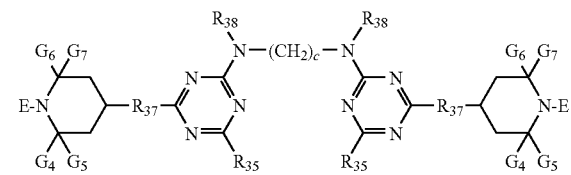 (H)
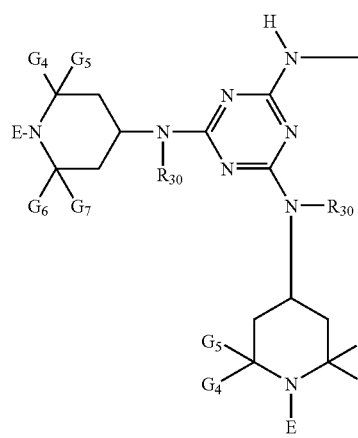 (J)
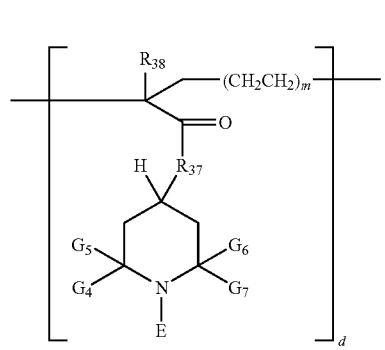 (K)
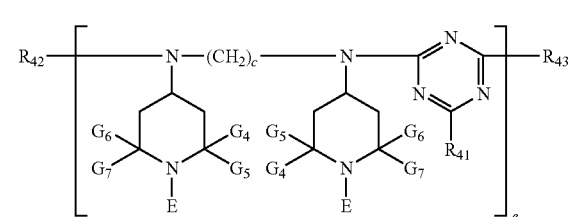 (L)

(M)

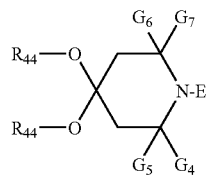

wherein E, $G_4$, $G_5$, $G_6$ and $G_7$ are as defined above;

m is 0 or 1;

$R_{29}$ is hydrogen, hydroxyl or hydroxymethyl;

$R_{30}$ is hydrogen, alkyl of 1 to 12 carbon atoms or alkenyl of 2 to 12 carbon atoms;

a is 1 to 4;

when a is 1, $R_{31}$ is hydrogen, alkyl of 1 to 18 carbon atoms, alkoxycarbonylalkylenecarbonyl of 4 to 18 carbon atoms, alkenyl of 2 to 18 carbon atoms, glycidyl, 2,3-dihydroxypropyl, 2-hydroxy or 2-(hydroxymethyl) substituted alkyl of 3 to 12 carbon atoms which alkyl is interrupted by oxygen, an acyl radical of an aliphatic or unsaturated aliphatic carboxylic or carbamic acid containing 2 to 18 carbon atoms, an acyl radical of a cycloaliphatic carboxylic or carbamic acid containing 7 to 12 carbon atoms, or acyl radical of an aromatic acid containing 7 to 15 carbon atoms;

when a is 2, $R_{31}$ is alkylene of 2 to 18 carbon atoms, a divalent acyl radical of an aliphatic or unsaturated aliphatic dicarboxylic or dicarbamic acid containing 2 to 18 carbon atoms, a divalent acyl radical of a cycloaliphatic dicarboxylic or dicarbamic acid containing 7 to 12 carbon atoms, or a divalent acyl radical of an aromatic dicarboxylic acid containing 8 to 15 carbon atoms;

when a is 3, $R_{31}$ is a trivalent acyl radical of an aliphatic or unsaturated aliphatic tricarboxylic acid containing 6 to 18 carbon atoms, or a trivalent acyl radical of an aromatic tricarboxylic acid containing 9 to 15 carbon atoms;

when a is 4, $R_{31}$ is a tetravalent acyl radical of an aliphatic or unsaturated aliphatic tetracarboxylic acid, especially 1,2,3,4-butanetetracarboxylic acid, 1,2,3,4-but-2-enetetracarboxylic acid, 1,2,3,5-pentanetetracarboxylic acid and 1,2,4,5-pentanetetracarboxylic acid, or $R_{31}$ is a tetravalent acyl radical of an aromatic tetracarboxylic acid containing 10 to 18 carbon atoms;

p is 1 to 3, $R_{32}$ is hydrogen, alkyl of 1 to 18 carbon atoms or acyl of 2 to 6 carbon atoms or phenyl;

when p is 1, $R_{33}$ is phenyl, alkyl of 1 to 18 carbon atoms, an acyl radical of an aliphatic or unsaturated aliphatic carboxylic or carbamic acid containing 2 to 18 carbon atoms, an acyl radical of a cycloaliphatic carboxylic or carbamic acid containing 7 to 12 carbon atoms, an acyl radical of an aromatic carboxylic acid containing 7 to 15 carbon atoms, or $R_{32}$ and $R_{33}$ together are —$(CH_2)_5CO$—, phthaloyl or a divalent acyl radical of maleic acid;

when p is 2, $R_{33}$ is alkylene of 2 to 12 carbon atoms, a divalent acyl radical of an aliphatic or unsaturated aliphatic dicarboxylic or dicarbamic acid containing 2 to 18 carbon atoms, a divalent acyl radical of a cycloaliphatic dicarboxylic or dicarbamic acid containing 7 to 12 carbon atoms, or a divalent acyl radical of an aromatic dicarboxylic acid containing 8 to 15 carbon atoms;

when p is 3, $R_{33}$ is a trivalent acyl radical of an aliphatic or unsaturated aliphatic tricarboxylic acid containing 6 to 18 carbon atoms, or a trivalent acyl radical of an aromatic tricarboxylic acid containing 9 to 15 carbon atoms;

b is 1 to 4, when b is 1, $R_{34}$ is alkoxy of 1 to 18 carbon atoms, alkenyloxy of 2 to 18 carbon atoms, —NHalkyl of 1 to 18 carbon atoms or —N(alkyl)$_2$ of 2 to 36 carbon atoms, when b is 2, $R_{34}$ is alkylenedioxy of 2 to 18 carbon atoms, alkenylenedioxy of 2 to 18 carbon atoms, —NHalkylene-NH— of 2 to 18 carbon atoms or —N(alkyl)-alkylene-N(alkyl)- of 2 to 18 carbon atoms, or $R_{34}$ is 4-methyl-1,3-phenylenediamino, when b is 3, $R_{34}$ is a trivalent alkoxy radical of a saturated or unsaturated aliphatic triol containing 3 to 18 carbon atoms, when b is 4, $R_{34}$ is a tetravalent alkoxy radical of a saturated or unsaturated aliphatic tetraol containing 4 to 18 carbon atoms, $R_{35}$ and $R_{36}$ are independently chlorine, alkoxy of 1 to 18 carbon atoms, —O-$T_1$, amino substituted by 2-hydroxyethyl, —NH(alkyl) of 1 to 18 carbon atoms, —N(alkyl)$T_1$ with alkyl of 1 to 18 carbon atoms, or —N(alkyl)$_2$ of 2 to 36 carbon atoms, $R_{37}$ is oxygen, or $R_{37}$ is nitrogen substituted by either hydrogen, alkyl of 1 to 12 carbon atoms or $T_1$, $T_1$ is

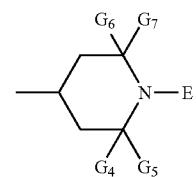

$R_{38}$ is hydrogen or methyl, c is 2 to 8, $R_{39}$ and $R_{40}$ are independently hydrogen or the group $T_2$, $T_2$ is

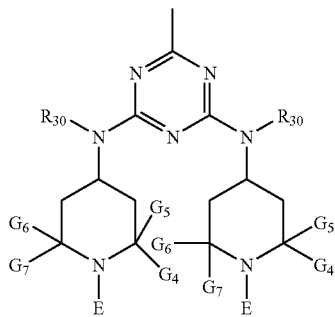

e is 1 to 10, for example 2-10;

d is an integer such that the compound has a molecular weight of 1000 to 4000 amu, e.g. d may be from the range 3-10;

$R_{41}$ is morpholino, piperidino, 1-piperizinyl, alkylamino of 1 to 10 carbon atoms, especially branched alkylamino of 3 to 8 carbon atoms such as tert-octylamino, —N(alkyl)$T_1$ with alkyl of 1 to 8 carbon atoms, or —N(alkyl)$_2$ of 2 to 16 carbon atoms, $R_{42}$ is hydrogen, acyl of 2 to 4 carbon atoms, carbamoyl substituted by alkyl of 1 to 4 carbon atoms, s-triazinyl substituted once by chlorine and once by $R_{41}$, or s-triazinyl substituted twice by $R_{41}$ with the condition that the two $R_{41}$ substituents may be different;

$R_{43}$ is chlorine, amino substituted by alkyl of 1 to 8 carbon atoms or by $T_1$, —N(alkyl)$T_1$ with alkyl of 1 to 8 carbon atoms, —N(alkyl)$_2$ of 2 to 16 carbon atoms, or the group $T_3$, $T_3$ is

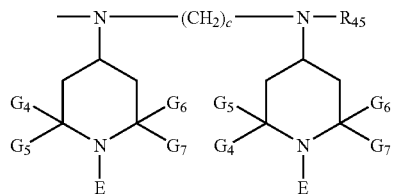

$R_{45}$ is hydrogen, acyl of 2 to 4 carbon atoms, carbamoyl substituted by alkyl of 1 to 4 carbon atoms, s-triazinyl substituted twice by —N(alkyl)$_2$ of 2 to 16 carbon atoms or s-triazinyl substituted twice by —N(alkyl)$T_1$ with alkyl of 1 to 8 carbon atoms;

$R_{44}$ is independently hydrogen, alkyl of 1 to 18 carbon atoms, alkoxycarbonylalkylenecarbonyl of 4 to 18 carbon atoms, alkenyl of 2 to 18 carbon atoms, glycidyl, 2,3-dihydroxypropyl, 2-hydroxy or 2-(hydroxymethyl) substituted alkyl of 3 to 12 carbon atoms which alkyl is interrupted by oxygen, an acyl radical of an aliphatic or unsaturated aliphatic carboxylic or carbamic acid containing 2 to 18 carbon atoms, an acyl radical of a cycloaliphatic carboxylic or carbamic acid containing 7 to 12 carbon atoms, or acyl radical of an aromatic acid containing 7 to 15 carbon atoms.

The secondary or tertiary sterically hindered amine is more preferably one of formula (C), (D) or (L), in particular of formula (C) or (L), especially of formula (L).

In formula (C), preference is given to the following:

a is 1 to 2, preferably 2;

when a is 1, $R_{31}$ is hydrogen, alkyl of 1 to 18 carbon atoms, alkoxycarbonylalkylenecarbonyl of 4 to 18 carbon atoms, alkenyl of 2 to 18 carbon atoms, glycidyl, 2,3-dihydroxypropyl, 2-hydroxy or 2-(hydroxymethyl) substituted alkyl of 3 to 12 carbon atoms which alkyl is interrupted by oxygen, an acyl radical of an aliphatic or unsaturated aliphatic carboxylic acid containing 2 to 18 carbon atoms;

when a is 2, $R_{31}$ is alkylene of 2 to 18 carbon atoms, a divalent acyl radical of an aliphatic or unsaturated aliphatic dicarboxylic acid containing 2 to 18 carbon atoms, preferably a divalent acyl radical of an aliphatic dicarboxylic acid containing 2 to 18 carbon atoms, especially containing 6 to 12 carbon atoms.

In formula (D), preference is given to the following:

p is 1 or 2, preferably 2;

$R_{32}$ is hydrogen or alkyl of 1 to 18 carbon atoms, preferably hydrogen;

when p is 1, $R_{33}$ is alkyl of 1 to 18 carbon atoms or an acyl radical of an aliphatic or unsaturated aliphatic carboxylic or carbamic acid containing 2 to 18 carbon atoms, for example $R_{33}$ is alkyl or an acyl radical of an aliphatic carboxylic acid containing 2 to 18 carbon atoms;

when p is 2, $R_{33}$ is alkylene of 2 to 12 carbon atoms or a divalent acyl radical of an aliphatic or unsaturated aliphatic dicarboxylic or dicarbamic acid containing 2 to 18 carbon atoms, for instance $R_{33}$ is alkylene of 2 to 12 carbon atoms.

In formula (L), preference is given to the following:

c is 4 to 8;

$R_{41}$ is alkylamino of 1 to 10 carbon atoms, especially branched alkylamino of 3 to 8 carbon atoms such as tert-octylamino, —N(alkyl)$T_1$ with alkyl of 1 to 8 carbon atoms, or —N(alkyl)$_2$ of 2 to 16 carbon atoms, in particular alkylamino of 1 to 10 carbon atoms;

$R_{42}$ is hydrogen, s-triazinyl substituted once by chlorine and once by $R_{41}$, or s-triazinyl substituted twice by $R_{41}$ with the condition that the two $R_{41}$ substituents may be different, for example $R_{42}$ is hydrogen or s-triazinyl substituted twice by $R_{41}$, especially $R_{42}$ is hydrogen;

$R_{43}$ is as described above, for example $R_{43}$ is the group $T_3$, $R_{45}$ of the group $T_3$ is hydrogen, s-triazinyl substituted twice by —N(alkyl)$_2$ of 2 to 16 carbon atoms or s-triazinyl substituted twice by —N(alkyl)$T_1$ with alkyl of 1 to 8 carbon atoms, for example $R_{45}$ of the group $T_3$ is hydrogen or s-triazinyl substituted twice by —N(alkyl)$_2$ of 2 to 16 carbon atoms, especially $R_{45}$ of the group $T_3$ is hydrogen.

The following commercial products are suitable as sterically hindered amines: TINUVIN® 622 (CAS 65447-77-0), HOSTAVIN® N 30 (CAS 202483-55-4), FERRO® AM 806 (CAS 70800-09-8), DASTIB® 845 (CAS 24860-22-8), TINUVIN® 770 (CAS 58829-07-9), TINUVIN® 765 (CAS 82919-37-7 and 41556-26-7), TINUVIN® 144 (CAS 63843-89-0), ADK STAB® LA 52 (CAS 91788-83-9), ADK STAB® LA 57 (CAS 64022-61-3), ADK STAB® LA 62 (CAS 107119-91-5), ADK STAB® LA 67 (CAS 100631-43-4), HOSTAVIN® N 20 (CAS 64338-16-5), HOSTAVIN® N 24 (CAS 85099-51-0 and 85099-50-9), SANDUVOR® 3050 (CAS 85099-51-0 and 85099-50-9), DIACETAM® 5 (CAS 76505-58-3), SUMISORB® TM 61 (CAS 84214-94-2), UVINUL® 4049 (CAS 109423-00-9), SANDUVOR® PR 31 (CAS 147783-69-5), GOODRITE® UV 3034 (CAS 71029-16-8), GOODRITE® UV 3150 (CAS 96204-36-3), GOODRITE® UV 3159 (CAS 130277-45-1), GOODRITE® 3110×128, UVINUL® 4050H (CAS 124172-53-8), CHIMASSORB® 944 (CAS 71878-19-8), CHIMASSORB® 2020 (CAS 192268-64-7), CYASORB® UV 3346 (CAS 82451-48-7), CYASORB® UV 3529 (CAS 193098-40-7), DASTIB® 1082 (CAS 113169-96-3), CHIMASSORB® 119 (CAS 106990-43-6), UVASIL® 299 (CAS 164648-93-5), UVASIL® 125 (CAS 164648-93-5), UVASIL® 2000 (CAS 164648-93-5), UVINUL® 5050H (CAS 152261-33-1 and 199237-39-3), LICHTSCHUTZSTOFF® UV 31, LUCHEM® HA B 18, ADK STAB® LA 63 (CAS 115055-30-6), ADK STAB® LA 68 (CAS 100631-44-5) or UVASORB® HA 88 (CAS 136504-96-6).

GOODRITE® 3110×128 is of formula

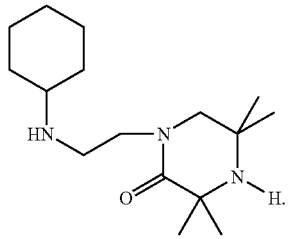

Lichtschutzstoff® UV 31 is of formula

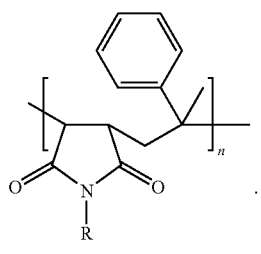

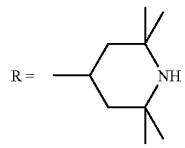

Of special interest is a commercially available secondary sterically hindered amine that is CHIMASSORB® 944 (CAS 71878-19-8), CHIMASSORB® 2020 (CAS 192268-64-7) or TINUVIN® 770 (CAS 58829-07-9), especially CHIMASSORB® 944 or TINUVIN® 770.

The ratio of component (a) to component (b) is preferably 2:1 to 1:100 by weight, more preferably 1:1 to 1:20 by weight, most preferably 1:2 to 1:16 by weight, for example 1:3 to 1:6 by weight.

This invention also relates to a compound of formula (II)—(VI) or one of the tautomers thereof,

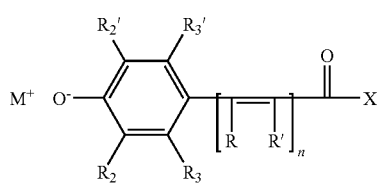

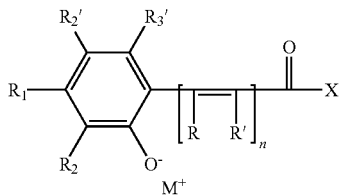

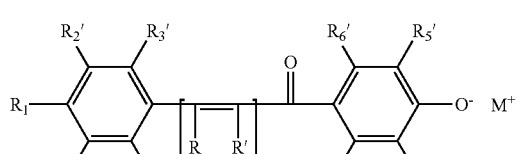

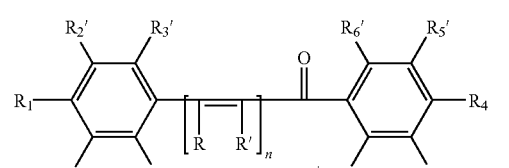

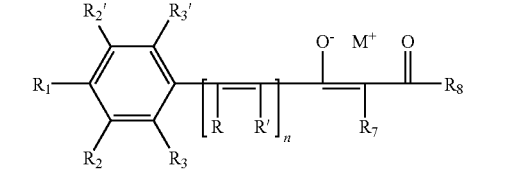

wherein $R, R', R_1, R_2, R_2', R_3, R_3', R_4, R_5, R_5', R_6, R_6', R_7, R_8, X$ and $n$ are as defined above, and $M^+$ is an ammonium cation or a phosphonium cation, with the provisos that (1) the ammonium cation and the phosphonium cation are not aromatic and do not have aromatic substituents which are directly connected to said ammonium cation or said phosphonium cation; and (2) M+ is different from phosphatidylcholine$^+$, in particular egg and soy phosphatidylcholine$^+$, more preferably phospholipid$^+$, most preferably tensid$^+$.

Compounds of formula (II)-(VI) may form tautomers. For example, these tautomers are compounds of formula (IIa)-(VIa)

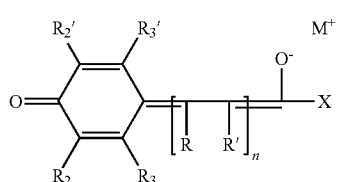

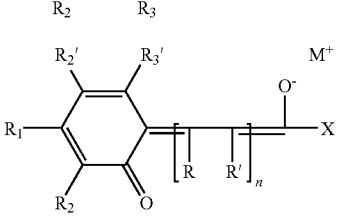

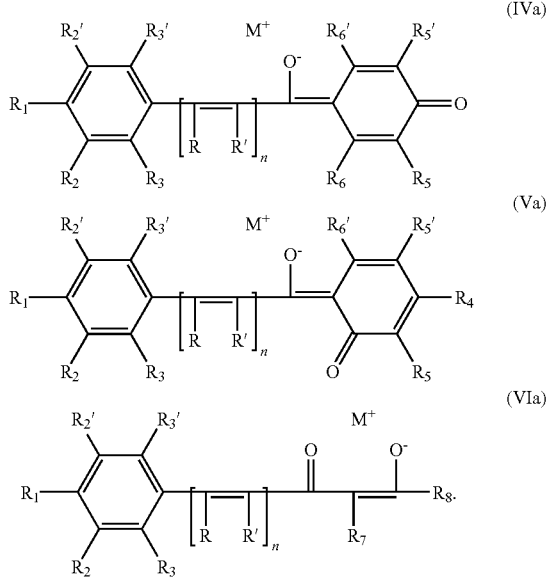

Preferably, M⁺ has a molecular weight of at least 150 g per mole, more preferably of at least 300 g per mole, most preferably of at least 350 g per mole.

For example, M⁺ is a secondary or tertiary ammonium cation or a secondary or tertiary phosphonium cation.

Preference is given to M⁺ being a secondary or tertiary ammonium cation, for example a secondary ammonium cation, in particular a secondary or tertiary sterically hindered ammonium cation, e.g. a secondary sterically hindered ammonium cation.

For instance, these secondary or tertiary ammonium cation or a secondary or tertiary phosphonium cation or a secondary or tertiary sterically hindered ammonium cation correspond to the secondary or tertiary amine or the secondary or tertiary phosphine or the secondary or tertiary sterically hindered amine as defined above that carry an additional H⁺ at the amine or phosphine functional group.

Another embodiment of this invention is a reversible thermochromic composition comprising
(i) a reversible thermochromic system as defined above or a compound of formula (II)-(VI) or one of the tautomers thereof as defined above and
(ii) a carrier material.

The weight ratio of component (i) to component (ii) is preferably 1:10000 to 1:1, more preferably 1:5000 to 1:2, most preferably 1:1000 to 1:5.

For example, the carrier material (ii) is polymers, solvents and/or waxes, especially polymers.

For instance, the carrier material (ii) is plastic articles, films, papers, fibers, solvents, waxes, coatings and/or inks, especially plastic articles and/or coatings, in particular plastic articles.

Example of polymers suitable as carrier material (ii) are:
1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:
  a) radical polymerisation (normally under high pressure and at elevated temperature).
  b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerization medium. The catalysts can be used by themselves in the polymerization or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).
2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).
3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethyllene-propylene copolymers, LDPE/ethylene-vinyl acetate copolymers (EVA), LDPE/ethyleneacrylic acid copolymers (EAA), LLDPE/EVA, LLDPE/EAA and alternating or random polyalkylene/carbon monoxide copolymers and mixtures thereof with other polymers, for example polyamides.
4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methylstyrene), poly(α-methylstyrene).
6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.
6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.
6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).
6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.
8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.
9. Polymers derived from α,β-unsaturated acids and derivatives thereof such as polyacrylates and polymethacrylates; polymethyl methacrylates, polyacrylamides and polyacrylonitriles, impact-modified with butyl acrylate.
10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.
11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.
12. Homopolymers and copolymers of cyclic ethers such as polyalkylene glycols, polyethyllene oxide, polypropylene oxide or copolymers thereof with bisglycidyl ethers.
13. Polyacetals such as polyoxymethylene and those polyoxymethylenes which contain ethylene oxide as a comonomer; polyacetals modified with thermoplastic polyurethanes, acrylates or MBS.
14. Polyphenylene oxides and sulfides, and mixtures of polyphenylene oxides with styrene polymers or polyamides.
15. Polyurethanes derived from hydroxyl-terminated polyethers, polyesters or polybutadienes on the one hand and aliphatic or aromatic polyisocyanates on the other, as well as precursors thereof.
16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).
17. Polyureas, polyimides, polyamide-imides, polyetherimids, polyesterimids, polyhydantoins and polybenzimidazoles.
18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.
19. Polycarbonates and polyester carbonates.
20. Polyketones.
21. Polysulfones, polyether sulfones and polyether ketones.
22. Crosslinked polymers derived from aldehydes on the one hand and phenols, ureas and melamines on the other hand, such as phenol/formaldehyde resins, urea/formaldehyde resins and melamine/formaldehyde resins.
23. Drying and non-drying alkyd resins.

24. Unsaturated polyester resins derived from copolyesters of saturated and unsaturated dicarboxylic acids with polyhydric alcohols and vinyl compounds as crosslinking agents, and also halogen-containing modifications thereof of low flammability.
25. Crosslinkable acrylic resins derived from substituted acrylates, for example epoxy acrylates, urethane acrylates or polyester acrylates.
26. Alkyd resins, polyester resins and acrylate resins crosslinked with melamine resins, urea resins, isocyanates, isocyanurates, polyisocyanates or epoxy resins.
27. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.
28. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.
29. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

Preferably, the carrier (ii) is a polymer which is listed above under item 1-3 and 5-6a in particular polyethylene, polypropylene, polystyrol, especially polypropylene, and copolymers containing these polymers such as acrylonitrile-butadiene-styrene copolymer.

Incorporation into the organic polymers can be effected, for example, by mixing in or applying to a β-phenylvinylketone or a ω-phenyl polyacetylenyl ketone with at least one acidic hydrogen and a base or by mixing in or applying to a compound of formula (II)-(VI) or one of tautomers thereof and, if desired, further additives by the methods which are customary in the art. The incorporation can take place prior to or during the shaping operation, or by applying the dissolved or dispersed compound to the polymer, with or without subsequent evaporation of the solvent. In the case of elastomers, these can also be stabilized as lattices.

A further possibility for incorporating the compounds mentioned above into polymers is to add them before, during or directly after the polymerization of the corresponding monomers or prior to crosslinking. In this context the compounds mentioned above can be added as it is or else in encapsulated form (for example in waxes, oils or polymers).

The compounds mentioned herein can also be added in the form of a masterbatch containing said compound in a concentration, for example, of from 2.5 to 25% by weight to the carrier material (ii).

The compounds mentioned herein can judiciously be incorporated by the following methods:
- as emulsion or dispersion (e.g. to lattices or emulsion polymers),
- as a dry mixture during the mixing in of additional components or polymer mixtures,
- by direct introduction into the processing apparatus (e.g. extruders, internal mixers, etc),
- as solution or melt.

A β-phenylvinylketone or a ω-phenyl polyacetylenyl ketone with at least one acidic hydrogen and a base, or a compound of formula (II)-(VI) or a tautomer thereof, with or without further additives, can also be sprayed onto the carrier material (ii) such as plastic article, fiber, film, paper or coating. It is able to dilute other additives (for example the conventional additives indicated above) or their melts so that they too can be sprayed together with these additives onto the carrier material (ii).

Of interest is a reversible thermochromic composition as defined above, comprising further additives.

Preferably, the further additives are antioxidants, UV-absorbers, light stabilizers, metal deactivators, processing stabilizers, thiosynergists, peroxide scavengers, oxygen scavengers, basic co-stabilizers, nucleating agents, fillers, reinforcing agents, flameproofing agents, optical brighteners and/or additional colorants (e.g. dyes and/or pigments) with the proviso that the additional colorants do not suppress and do not mask the thermochromic effect.

Most preferably, the further additives are phenolic antioxidants, aminic antioxidants, phosphites, phosphonites, hydroxylamines, nitrones, benzofuranones, indolinones, 2-(2-hydroxyphenyl)benzotriazoles, 2-hydroxybenzophenones, 2-(2-hydroxyphenyl)-1,3,5-triazines, oxamides, sterically hindered amines, pigments and/or dyes.

Examples of such further additives are:
1. Antioxidants
1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.
1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.
1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.
1.4. Tocopherols, for example α-tocopherol, β-tocopherol, γ-tocopherol, δ-tocopherol and mixtures thereof (vitamin E).
1.5. Hydroxylated thiodiphenyl ethers, for example 2, 2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.
1.6. Alkylidenebisphenols, for example 2, 2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'- methylenebis[6-(α-methylbenzyl)-4-nonylphenol], 2,2'-methylenebis[6-(α,α-dimethylbenzyl)-4-nonylphenol], 4,4'-methyllenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3, 5,3',5'-tetra-tert-butyl-4,4'-dihydroxydibenzyl ether, octadecyl-4-hydroxy-3,5-dimethyl benzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl) malonate, di-octadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzypisocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl)propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octyl-phenothiazines, a mixture of mono- and dialkylated tert-octyl-phenothiazines, N-allylphenothiazine, N,N,N',N'-tetraphenyl-1,4-diaminobut-2-ene.

2. UV absorbers and light stabilizers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl -5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]-benzotriazole; 2-[2'-hydroxy-3'-(1,1,3,3-tetramethylbutyl)-5'-(α,α-dimethylbenzyl)-phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxy-cinnamate, N-(β-carbomethoxy-β-cyanovinyl)-2-methylindoline, neopentyl tetra(α-cyano-β,β-diphenylacrylate.

2.5. Nickel compounds, for example nickel complexes of 2,2'-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)

hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydrooxy-2-methylpropoxy)-4-octadecanoyloxy-2,2,6,6-tetramethylpiperidine, 5-(2-ethylhexanoyl)oxymethyl-3,3,5-trimethyl-2-morpholinone, Sanduvor (Clariant; CAS Reg. No. 106917-31-1], 5-(2-ethylhexanoyl)oxymethyl-3,3,5-trimethyl-2-morpholinone, the reaction product of 2,4-bis-[(1-cyclohexyloxy-2,2,6,6-piperidine-4-yl)butylamino]-6-chloro-s-triazine with N,N'-bis(3-aminopropyl)ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)amino)-s-triazine.

2.7. Oxamides, for example 4, 4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydrooxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,4-dicumylphenyl) pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2"-nitrilo-[triethyltris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl) phosphite (Irgafos® 168, Ciba Specialty Chemicals Inc.), tris(nonylphenyl) phosphite,

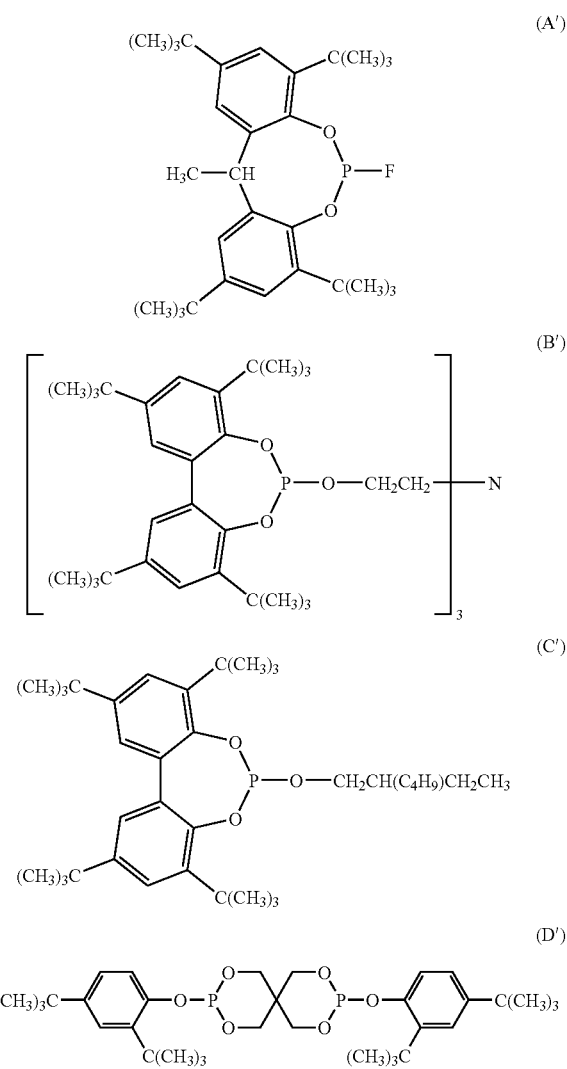

-continued

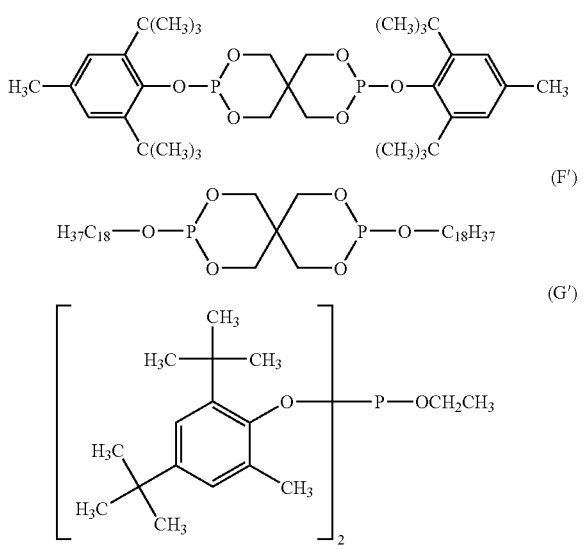

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxyylamine, N-heptadecyl-N-octadecylhydroxylamine, N,N-dialkylhydroxylamine derived from hydrogenated tallow amine.
6. Nitrones, for example, N-benzyl-alpha-phenylnitrone, N-ethyl-alpha-methylnitrone, N-octylalpha-heptylnitrone, N-lauryl-alpha-undecylnitrone, N-tetradecyl-alpha-tridecylnnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.
7. Thiosynergists, for example dilauryl thiodipropionate, dimistryl thiodipropionate, distearyl thiodipropionate or distearyl disulfide.
8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.
9. Polyamide stabilizers, for example copper salts in combination with iodides and/or phosphorus compounds and salts of divalent manganese.
10. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.
11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.
12. Fillers and reinforcing agents, for example calcium carbonate, silicates, glass fibres, glass beads, asbestos, talc, kaolin, mica, barium sulfate, metal oxides and hydroxides, carbon black, graphite, wood flour and flours or fibers of other natural products, synthetic fibers.
13. Other additives, for example plasticisers, lubricants, emulsifiers, pigments, rheology additives, catalysts, flow-control agents, optical brighteners, flameproofing agents, antistatic agents and blowing agents.
14. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839, EP-A-0591102; EP-A-1291384 or 3-[4-(2-acetoxyethoxy)phenyl]-5,7-di-tert-butylbenzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one, 3-(2-acetyl-5-isooctylphenyl)-5-isooctylbenzofuran-2-one.

The further additives are judiciously employed in amounts of 0.1-10% by weight, for example 0.2-5% by weight, based on the carrier material (ii).

A further aspect of this invention is the use of a β-phenylvinylketone with at least one acidic hydrogen in combination with a base or a ω-phenyl polyacetylenyl ketone with at least one acidic hydrogen in combination with a base or a compound of formula (II)-(VI) or one of its tautomers as defined above as a reversible thermochromic colorant for instance in a reversible thermochromic system for example in a carrier such as carrier (ii).

Preference is given to the use of a β-phenylvinylketone with at least one acidic hydrogen or a ω-phenyl polyacetylenyl ketone with at least one acidic hydrogen in combination with a base as defined above.

Another aspect of this invention is a process for reversible thermochromically coloring a carrier such as carrier (ii) by applying thereto/incorporating therein a β-phenylvinylketone with at least one acidic hydrogen in combination with a base or a ω-phenyl polyacetylenyl ketone with at least one acidic hydrogen in combination with a base or a compound of formula (II)-(VI) or one of tautomers thereof as defined above.

Preference is given to a process for reversible thermochromically coloring a carrier by applying thereto/incorporating therein a β-phenylvinylketone with at least one acidic hydrogen in combination with a base or a ω-phenyl polyacetylenyl ketone with at least one acidic hydrogen in combination with a base, whereby the base is as defined above.

An embodiment of this invention is a compound of formula (I) as defined above, with the proviso the compound is not

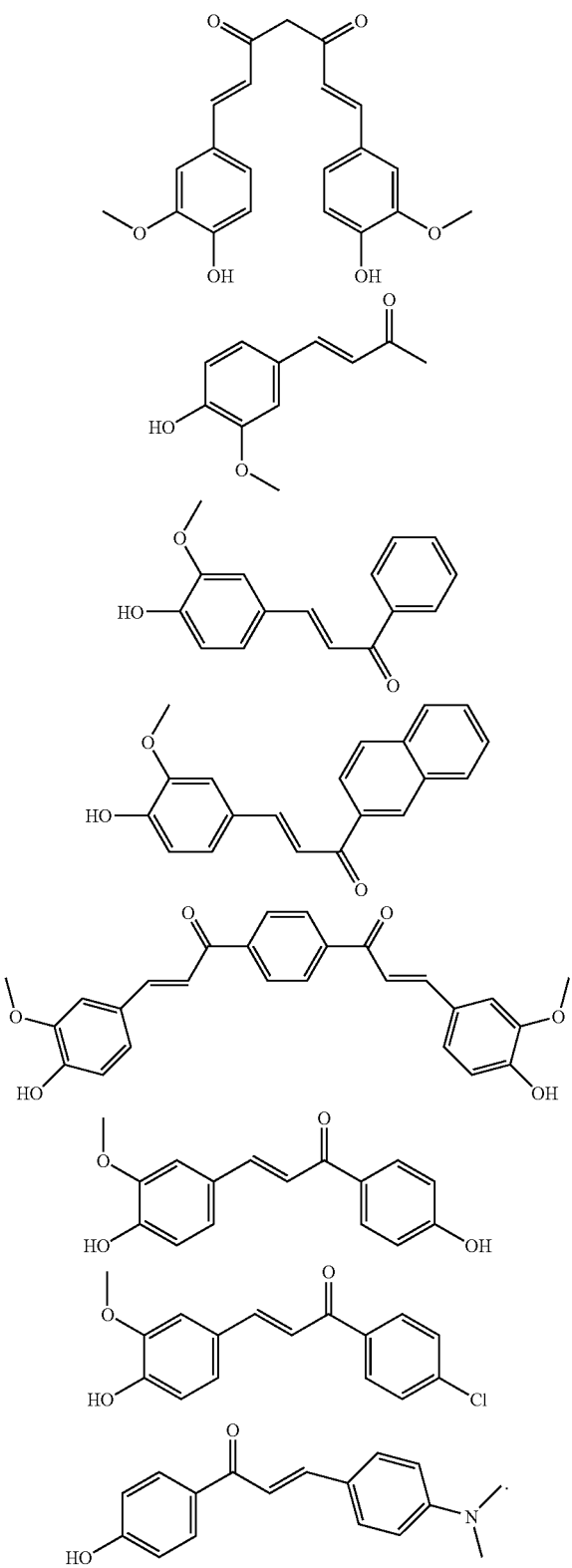

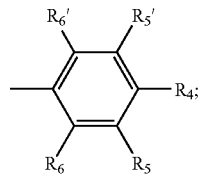

More preferably, at least one substituent is or contains $NO_2$.

Most preferably, X is or X is $C_8$-$C_{12}$aralkenyl which is unsubstituted or substituted;

n is 1;

R and R' are hydrogen;

$R_1, R_2, R_2', R_3, R_3', R_4, R_5, R_5', R_6$ and $R_6'$ are independently hydrogen, hydroxy, $NO_2$ or $OR_{11}$;

$R_{11}$ is independently $C_1$-$C_{30}$alkyl;

the substituted aralkenyl is substituted by $NO_2$.

Preferably, $R_{11}$ is $C_1$-$C_5$alkyl, especially methyl.

Preferably, X is not unsubstituted $C_8$-$C_{12}$aralkenyl.

The preferences for compounds of formula (I) of the reversible thermochromic system outlined above are also eligible for this embodiment.

The definitions and examples given below apply to all such terms herein.

In compounds containing more than one substituent of at least one of $R_9$-$R_{14}$ each of $R_9$-$R_{14}$ is independently as defined herein.

Polyacetylenyl is for instance an univalent radical of polyacetylene such as 1,3-butadienyl, 1,3,5-hexatrienyl, 1,3,5,7-octatetraenyl, 1,3,5,7,9-decapentaenyl or 1,3,5,7,9,11-dodecahexaenyl.

In the definitions herein the term alkyl comprises within the limits of the carbon atoms given, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, 2-methylheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl and dodecyl.

For instance, the term alkyl comprises cycloalkyl such as cyclobutyl, cyclopentyl, cyclohexyl, methylcyclopentyl, dimethylcyclopentyl and methylcyclohexyl. Preferably, the term alkyl does not comprise cycloalkyl.

Examples of alkenyl are vinyl, allyl, butenyl, pentenyl, hexenyl, heptenyl, octenyl, nonenyl, decenyl, undecenyl and dodecenyl. The term alkenyl also comprises residues with more than one double bond that may be conjugated or non-conjugated.

For instance, the term alkenyl comprises cycloalkenyl such as cyclobutenyl, cyclopentenyl, cyclohexenyl, methylcyclopentenyl, dimethylcyclopentenyl and methylcyclohexenyl. Preferably, the term alkenyl does not comprise cycloalkenyl.

Examples of alkynyl are ethynyl, 1-propynyl, 2-propynyl, butynyl, pentynyl, hexynyl, heptynyl, octynyl, nonynyl, decynyl, undecynyl and dodecynyl. The term alkynyl comprises residues with one or more triple bonds with optionally one or more double bonds whereby the unsaturated bonds may be conjugated or non-conjugated.

For instance, the term alkynyl comprises cycloalkynyl such as cyclopentynyl, cyclohexynyl, methylcyclopentynyl, dimethylcyclopentynyl and methylcyclohexynyl. Preferably, the term alkynyl does not comprise cycloalkynyl.

Preferably, at least one substituent is or contains a radical selected from the group consisting of $C_2$-$C_{30}$alkinyl, $C_7$-$C_{12}$aralkyl, $C_8$-$C_{12}$aralkynyl, $NO_2$, CN, $SR_{11}$, $S(=O)R_{11}$, $S(=O)_2R_{11}$, CO—O—$R_{11}$, O—CO—$R_{11}$, CO—$NR_9R_{10}$ or $NR_9$—CO—$R_{11}$.

Aryl is for instance phenyl or naphthyl whereas aralkyl is for example benzyl.

An example of an aralkenyl is 2-phenylethenyl, an example of an aralkynyl is 2-phenylethynyl.

Examples of halogen are F, Cl, Br and I, especially Cl and Br, in particular Cl.

Examples of alkylene are methylene, ethylene, propylene, isopropylene, n-butylene, sec-butylene, isobutylene, tert-butylene, 2-ethylbutylene, n-pentylene, isopentylene, 1-methylpentylene, 1,3-dimethylbutylene, n-hexylene, 1-methylhexylene, n-heptylene, 2-methylheptylene, 1,1,3,3-tetramethylbutylene, 1-methylheptylene, 3-methylheptylene, n-octylene, 2-ethylhexylene, 1,1,3-trimethylhexylene, 1,1,3,3-tetramethylpentylene, nonylene, decylene, undecylene, 1-methylundecylene and dodecylene.

Examples of alkenylene are within the limits of the carbon atoms given vinylene, allylene, butenylene, pentenylene, hexenylene, heptenylene, octenylene, nonenylene, decenylene, undecenylene and dodecenylene. The term alkenylene also comprises residues with more than one double bond that may be conjugated or non-conjugated.

For instance, alkoxy means that an alkyl group as defined above with an appropriate number of carbon atoms is connected to O.

For example, alkenyloxy means that an alkenyl group as defined above with an appropriate number of carbon atoms is connected to O.

Alkylenedioxy can be defined as O-alkylene-O. Alkenylenedioxy can be defined as O-alkenylene-O.

For instance, acyl is acetyl, propionyl or butyryl.

Some examples of an aliphatic carboxylic acid are acetic, propionic, butyric, stearic acid. An example of a cycloaliphatic carboxylic acid is cyclohexanoic acid. An example of an aromatic carboxylic acid is benzoic acid. An example of an aliphatic dicarboxylic acid is malonyl, maleoyl, succinyl, adipic or sebacic acid. An example of a residue of an aromatic dicarboxylic acid is phthaloyl.

Acyl radicals of monocarboxylic acids are, within the definitions, a residue of the formula —CO—R", wherein R" may stand inter alia for an alkyl, alkenyl, cycloalkyl or aryl radical as defined. Preferred acyl radicals include acetyl, benzoyl, acryloyl, methacryloyl, propionyl, butyryl, valeroyl, hexanoyl, heptanoyl, octanoyl, nonanoyl, decanoyl, undecanoyl, dodecanoyl, pentadecanoyl, stearoyl. Polyacyl radicals of polyvalent acids are of the formula (—CO)$_{n1}$—R", wherein n1 is the valency, e.g. 2, 3, 4, 5 or 6.

The compounds described herein can be synthesized according to methods known in the art from known starting materials. Some of the compounds described herein are commercially available.

The β-phenylvinylketone or ω-phenyl polyacetylenyl ketone with at least one acidic hydrogen can be obtained by reacting a ketone (component 1) with a phenylketone, a β-phenylvinylketone, a ω-phenyl polyacetylenyl ketone, a benzaldehyde, a β-phenylvinylaldehyde or a ω-phenyl polyacetylenyl aldehyde with at least one acidic hydrogen (component 2). For instance, the ratio of component 1 to component 2 is from 1:10 to 10:1, preferably from 1:2 to 2:1, more preferably from 1.5:1 to 1:1.5, most preferably about 1:1. Usually an acid or a base is present as catalyst. Suitable acids as catalyst are $H_2SO_4$, hydrogen halide such as HBr, a sulphonic acid such as p-toluene sulphonic acid or methane sulphonic acid, boric acid, o-phosphoric acid or an acetic acid such as trifluoroacetic acid or trichloroacetic acid. Suitable bases as catalysts are alkaline metal hydroxides such as KOH, NaOH or LiOH or alkaline-earth metal hydroxides such as $Mg(OH)_2$ or $Ca(OH)_2$. The amount of catalyst is usually 0.001-0.5 mole per mole of component 2. The reaction is generally carried out in an inert atmosphere such as under nitrogen or argon. The instant process can be run under atmospheric pressure (preferred) as well as under reduced or elevated pressure. The reaction is usually carried out at elevated temperature such as 50-150° C. The reaction is generally carried out in a solvent, for instance an organic solvent such as an ether (e.g. tetrahydrofuran, dimethoxyethylether), an alcohol (e.g. methanol, isopropanol, n-butanol or tert amyl alcohol), an aromatic hydrocarbon (e.g. toluene, xylene isomer mixture, mesitylene or ethyl benzene), a halogenated aromatic hydrocarbon (e.g. chloro benzene) or dimethylacetamide. The obtained product can be isolated by methods known in the art. The obtained product can be purified by methods known in the art such as chromatography or crystallization.

Compounds of formula (II)-(VI) or one of the tautomers thereof can be prepared by mixing a1) a compound of formula (I) with b1) a phosphine or amine and reacting them together:

A) by melting the mixture at temperatures above the melting or softening points of the components and cooling the resulting salt to ambient temperature, or B) by dissolving the components a1) and b1) in a convenient solvent, evaporating the solvent by heating or in vacuo, and cooling the residue to ambient temperature. Most solvents can be used for this purpose, as long as they are able to dissolve both components (but do not react with them) and can be evaporated afterwards. Some examples of solvents are dichloromethane, chloroform, methanol, ethanol, tetrahydrofuran, 1,4-dioxane, dimethyl formamide, acetone, acetonitrile, ethyl acetate and butyl acetate and mixtures thereof.

The sterically hindered amines described above are essentially known and commercially available. They can be prepared by known processes.

The preparation of the secondary or teriary sterically hindered amines is disclosed for example in U.S. Pat. Nos. 4,233,412, 4,340,534, WO-A-98/51,690, U.S. Pat. Nos. 5,679,733, 3,640,928, 4,198,334, 5,204,473, 4,619,958, 4,110,306, 4,110,334, 4,689,416, 4,408,051, SU-A-768,175 (Derwent 88-138,751/20), U.S. Pat. Nos. 5,049,604, 4,769,457, 4,356,307, 4,619,956, 5,182,390, GB-A-2,269,819, U.S. Pat. Nos. 4,292,240, 5,026,849, 5,071,981, 4,547,538 and 4,976,889, 4,086,204, 6,046,304, 4,331,586, 4,108,829, 5,051,458, WO-A-94/12,544 (Derwent 94-177,274/22), DD-A-262,439 (Derwent 89-122,983/17), U.S. Pat. Nos. 4,857,595, 4,529,760, 4,477,615 and CAS 136, 504-96-6.

The reversible thermochromic system or composition or compound of formula (II)-(VI) or one of the tautomers thereof as mentioned above may be used to indicate temperature changes in appliances or devices. The temperature change effects color changes which may be assessed by the human eye or by optical devices resulting in an effect signal.

An application of the reversible thermochromic systems or compositions or compounds of formula (II)-(VI) or one of the tautomers thereof as described above is in the market of household appliances. For safety reasons there is often the need that the heated part of a certain device is evidenced through the appearance of a different and clearly distinguishable color.

For instance, in small appliances this is often desirable for kettles, percolators, toasters, indoor grills, slow cookers, food steamers, waffle makers, vacuum packaging systems, fryers, deep fryers, irons and rice cookers, where the high temperature may be indicated by the different color of a part of the item itself or of a label. The part or the label can be interchangeable, so that they can be changed with a new one available either in the original package or at the dealer, when the color change effect is no longer visible.

These thermochromic systems or compositions or compounds of formula (II)-(VI) or one of the tautomers thereof can be used in large appliances like cook-tops, dryers, ovens, space heaters, steam cleaners, dishwashers, refrigerator, freezers and washing machines, where the high temperature may be indicated by the different color of a part of the item itself or of a label.

The application of a reversible thermochromic system or composition or compound of formula (II)-(VI) or one of the tautomers thereof is not limited to the incorporation into plastic parts of household appliances, but may find application also in many other contexts, for example:

agricultural covers for light regulation purposes, in order to positively affect the development and harvesting of crops;

inks in general, to be used in printing systems or in color-changing laminates, optionally as microencapsulated composition fibers and fabrics in general (both woven and non-woven), for apparel having fancy and fashionable features and for apparel and non-apparel purposes with functional characteristics, including brand protection;

toys, including fabrics for clothes and molded objects to increase the appeal and the amusement from the article;

food and non-food packaging, as temperature indicators ("too hot": article has to be refrigerated; or: "just the right temperature": article is at its best for consumption);

promotional items such as hidden messages in tags, cards or labels; spoons, straws or stirrers for hot-cold drinks.

All %, parts and ratio are % by weight, parts by weight and ratio by weight unless otherwise stated.

r.t. room temperature (20-25° C.)

g gram obtained, the solid is filtered, washed and dried. 29.3 g of product is recovered; yield 80%.

$^1$H NMR (300 MHz, CDCl$_3$); δ range 5.8.0 (11H); 3.9 (s, 6H); 1.8 (s, 2H)

Example 2

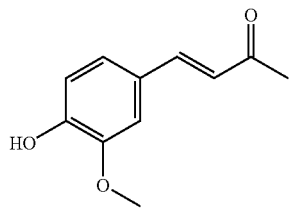

55 g of potassium hydroxide (0.82 mol) are dissolved in 300 ml of methanol; 120 ml of THF are added. 100 g of 4-hydroxy-3-methoxy benzaldehyde (0.66 mol) and 100 g of acetone (1.7 mol) are added to the previous solution. The mixture is heated to reflux under nitrogen for 16 hours. After that, 56 g of acetic acid are added to the reaction mixture at 20° C. The mixture is concentrated at a rotary evaporator and the residue recovered with dichloromethane and washed with water. The organic layer is concentrated and the crude product is crystallized from dichlorobenzene. 95 g of a solid are obtained, yield 75%.

$^1$H NMR (300 MHz, CDCl$_3$); δ 7.5 (d, 1H); 7.1 (m, 2H); 6.9 (d, 1H); 6.6 (m, 2H); 3.9 (s, 3H); 2.3 (s, 3H)

COMPOUND EXAMPLES

Example 1

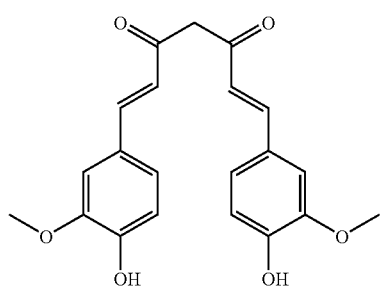

10 g of 2,4-pentanedione (0.1 mol), 46 g of tributylborate (0.2 mol), 10.0 g of boron trioxide (0.14 mol) and 30.0 g of 4-hydroxy-3-methoxy benzaldehyde (0.2 mol) are mixed with 50 ml of dimethylacetamide. The mixture is warmed to 80° C. for one hour. After cooling to 30° C., 3.0 g of n-butylamine are added to the reaction mixture. After 5 hours at 30° C. the reaction is poured into a mixture of 600 ml of water, 60 ml of acetic acid and 60 ml of xylene. A precipitate is Example 3

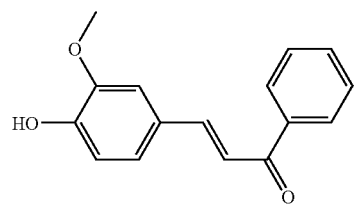

14 g of potassium hydroxide (0.20 mol) are dissolved in 75 ml of methanol, 25 g of 4-hydroxy-3-methoxy benzaldehyde (0.16 mol) are added. 30 g of acetophenone (0.25 mol) and 75 ml of THF are added; the mixture is heated to reflux for 20 hours. After cooling to r.t., 15 g of acetic acid are added to the reaction mixture. The mixture is concentrated at a rotary evaporator, recovered with dichloromethane and washed with a solution of potassium carbonate and water. The organic layer is concentrated at a rotary evaporator and the solid washed with isopropylether. 19 g of a solid are obtained, yield 46%.

¹H NMR (300 MHz, CDCl₃); δ8.0 (m, 2H); 7.8 (d, 1H); 7.5 (m, 4H); 7.2 (m, 2H); 7.0 (d, 1H); 6.3 (s, 1H); 3.9 (m, 3H)

Example 4

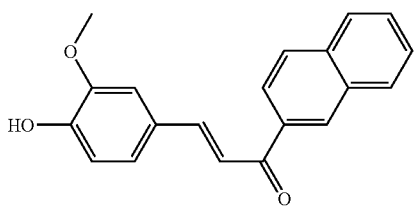

14 g of potassium hydroxide (0.20 mol) are dissolved in 75 ml of methanol, 25 g of 4-hydroxy-3-methoxybenzaldehyde (0.16 mol) are added. 36 g of 2-acetylnaphthalene (0.21 mol) and 75 ml of THF are added; the mixture is heated to reflux for 20 hours. Working-up as in Example 3, 20 g of product are obtained, yield 44%.

¹H NMR (300 MHz, CDCl₃); δ8.5 (s, 1H); 8.2 (d, 1H); 7.9 (m, 4H); 7.6 (m, 3H); 7.3 (d, 1H); 7.2 (s, 1H); 7.0 (d, 1H); 6.4 (s, 1H); 4.0 (s, 3H)

Example 5

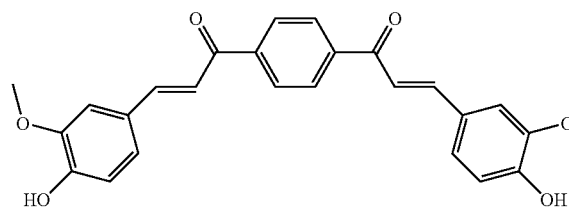

12 g of 1,4-diacetylbenzene (0.074 mol), 35 g of vanillin (0.23 mol), 100 ml of methanol and 0.15 ml of sulphuric acid are put into a flask. The mixture is heated to reflux under nitrogen for 40 hours. After cooling the obtained precipitate is filtered. 20 g of product are obtained: yield 63%.

¹H NMR (300 MHz, CDCl₃); δ9.8 (s broad, 2H); 8.2 (s, 4H); 17.8 (m, 4H); 7.6 (s, 2H); 7.4 (d, 2H); 6.6 (d, 2H)

Example 6

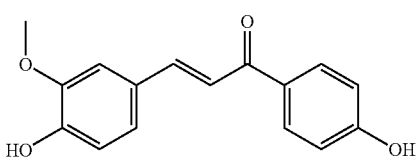

18 g of 4-hydroxyacetophenone (0.13 mol), 30 g of vanillin (0.2 mol), 150 ml of methanol and 5 ml of hydrogen bromide in acetic acid (33%) are put into a flask. The mixture is heated to reflux for 8 hours. After that 35 g of tri-n-butylborate (0.15 mol) are added to the reaction mixture and the reaction is maintained at reflux for 12 hours. The formed precipitate is filtered after cooling and crystallized from diisopropylether. 26 g of product are obtained, yield 73%.

¹H NMR (300 MHz, CDCl₃); δ 10 (s broad, 2H); 8.0 (d, 2H); 7.6 (m, 2H); 7.4 (s, 1H); 7.2 (d, 1H); 6.8 (m, 3H); 3.8 (s, 3H)

Example 7

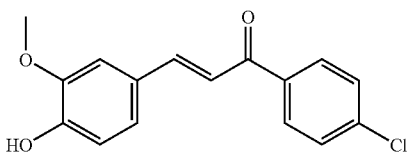

31 g of 4-chloroacetophenone (0.2 mol), 15.2 g of vanillin (0.1 mol) and 5 ml of hydrogen bromide in acetic acid (33%) are mixed and warmed to 25° C. for 3 hours. After that 35 g of tri-n-butylborate (0.15 mol) are added, the reaction is warmed to 45° C. for 2 hours. After cooling to 20° C., potassium hydrogencarbonate is added to neutralize the acid catalyst, and water and toluene are added. The organic phase is isolated and washed with 8 g of potassium hydroxide in water; the aqueous phase is separated, acidified and washed with dichloromethane. The organic phase is isolated and concentrated at a rotary evaporator; the crude product is crystallized from diisopropylether. 18.6 g of product are obtained, yield 64%.

¹H NMR (300 MHz, CDCl₃); δ 9.8 (s broad, 2H); 8.1 (d, 2H); 7.7 (m, 2H); 7.6 (d, 2H); 7.5 (s, 1H); 7.2 (d, 1H); 6.8 (d, 1H)

Example 8

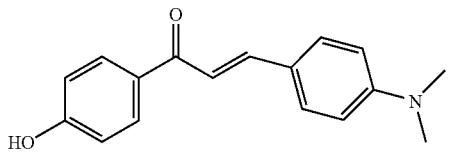

13.0 g of 4-hydroxyacetophenone (0.096 mol), 28.0 g of N,N-dimethyl-p-amino benzaldehyde (0.19 mol) and 60 g of a solution 33% of hydrogen bromide in acetic acid are put into a flask and warmed to 50° C. for 20 hours. The formed precipitate is filtered and suspended in water and dichloromethane, potassium carbonate is added until pH is basic. The organic layer is washed with water and concentrated; the obtained crude product is crystallized from xylene. 14.3 g of product are obtained, yield 56%.

¹H NMR (300 MHz, CDCl₃); δ8.0 (d, 2H); 7.6 (m, 4H); 6.6 (d, 2H); 6.4 (d, 2H); 2.9 (s, 6H)

Example 9

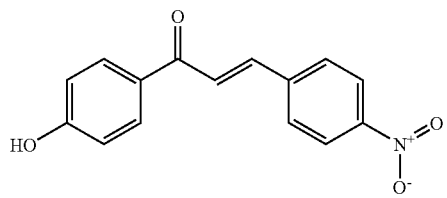

7.7 g of potassium hydroxide (0.11 mol) are dissolved in 100 ml of methanol; 13.6 g of 4-hydroxyacetophenone (0.1 mol) and 22.6 g of p-nitrobenzaldehyde are added. The mixture is heated to reflux for 20 hours. After cooling to 20° C., the reaction is neutralized with acetic acid and a precipitate is formed. This solid is filtered, washed with methanol and dried. 11.2 g of product are obtained; yield 43%.

$^1$H NMR (300 MHz, CDCl$_3$); δ10.5 (s broad, 1H); 8.2 (d, 2H); 8.1 (m, 5H); 7.6 (d, 1H); 6.9 (d, 2H)

Example 10

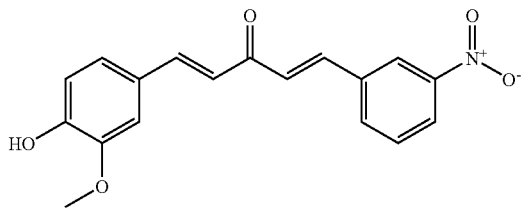

1.9 g of potassium hydroxide (0.03 mol) are dissolved in 150 ml of methanol; 5.0 g of the compound of Example 2 (0.03 mol) and 3.9 g of 3-nitrobenzaldehyde (0.03 mol) are added. The mixture is warmed to 60° C. under nitrogen. After 10 hours the reaction is cooled and neutralized with acetic acid. The mixture is concentrated at a rotary evaporator, and the residue is recovered with dichloromethane. The solution is washed with water, and the organic layer is separated and concentrated. The solid obtained is crystallized from methanol. 6.2 g of product are obtained; yield 73%.

$^1$H NMR (300 MHz, CDCl$_3$); δ 8.4 (s, 1H); 8.2 (d, 1H); 7.8 (d, 1H); 7.5 (m, 1H); 7.2 (m, 3H); 6.9 (m, 2H); 3.9 (s, 3H)

Application Examples

Example 11

Formulation 1: 0.3 g of compound of Example 1, corresponding to 0.1% of the total amount of the formulation, and 1.5 g of poly[[6-[(1,1,3,3-tetramethylbutyl)amino]-1,3,5-triazine-2,4-diyl][(2,2,6,6-tetramethyl-4-piperidinyl)imino]-1,6-hexanediyl[2,2,6,6-tetramethyl-4-piperidinyl)imino]] (base 1), corresponding to 0.5%, are mixed in a turbomixer with 298.2 g of polypropylene powder (Basell Moplen HP500H) having a melt index of 1.8 (measured at 230° C. and 2.16 Kg).

The mixture is extruded at 190-230° C. using a lab-scale twin-screw extruder (OMC, Ø 19 mm, L/D=25) to give polymer granules which are subsequently converted into plaques 2 mm thick, using a press-molding machine (Pasadena P210 C), operating at a maximum temperature of 240° C. and pressure of 323 bar.

The same procedure is applied to formulations 2 to 6, with the following differences to formulation 1:

Formulation 2: compound of Example 5 instead of Example 1
Formulation 3: compound of Example 3 instead of Example 1
Formulation 4: compound of Example 4 instead of Example 1
Formulation 5: bis(2,2,6,6-tetramethyl-4-piperidyl)sebacate (base 2), instead of base 1.
Formulation 6: titanium dioxide (Kronos Titan) in addition to the compound of Example 1 and base 1; the weighted amounts of the formulation are 0.3, 1.5, 0.3 and 297.9 g for the compound of Example 1, base 1, titanium dioxide and the polypropylene powder respectively; the amount of titanium dioxide corresponds to 0.1% of the total amount of the formulation.

In order to induce a color change the plaques thus prepared are dipped into a silicon oil bath at 100° C., which is above the temperature of color switching. The change in color is assessed visually and reported in the table below:

| | Visual color | |
|---|---|---|
| Formulation | At r.t. | At T = 100° C. |
| 1 | Red | Orange |
| 2 | Brown-red | Dark orange |
| 3 | Bright yellow | Pale yellow |
| 4 | Orange | Yellow |
| 5 | Red | Orange |
| 6 | Red-brown | Orange |

Some comparison formulations are prepared in the same manner of formulations 1-6:

Formulation 1b: same as formulation 1, but without base 1.
Formulation 2b: same as formulation 2, but without base 1.
Formulations 1b and 2b at room T have visually the same color as formulations 1 and 2 respectively at 100° C., thus the colorimetric data of the four formulations can be compared in order to quantify the color change due to the thermochromic effect. The values are determined using a Minolta colorimeter CM-508d considering the CIEL*a*b* colorimetric space. The relevant values are reported in the table below:

| | Visual color | | | | b* |
|---|---|---|---|---|---|
| Formulation | At r.t. | At T = 100° C. | L* at r.t. | a* at r.t. | at r.t. |
| 1 | Red | Orange | 37.60 | 38.03 | 21.63 |
| 1b | Orange | Orange | 43.01 | 33.20 | 30.49 |
| 2 | Brown-red | Dark orange | 35.64 | 32.27 | 16.70 |
| 2b | Dark orange | Dark orange | 38.21 | 32.60 | 19.45 |

The large changes of the colorimetric values between formulations 1 and 1b and 2 and 2b respectively show how efficiently the color of the plaques changes with temperature. All the formulations kept under ambient indoor lighting retain the original color for months.

Example 12

Formulations 1 and 2 are subjected to the following experiment, in order to test the persistency of the thermochromic effect under repeated heating-cooling cycles (fatigue). By means of an automated system, plaques of the formulations 1 and 2 are dipped for 30 minutes into a silicon oil bath kept at 95° C., then lifted and let cool down at room T for further 30 minutes; after this the plaques are dipped again and the cycle is repeated for than 100 times. The thermochromic change is still present after more than 100 cycles.

Example 13

Formulation 7: 1.2 g of compound of Example 9, corresponding to 0.1% of the total amount of the formulation, and 6.0 g of poly[[6-[(1,1,3,3-tetramethylbutyl)amino]-1,3,5-triazine-2,4-diyl][(2,2,6,6-tetramethyl-4-piperidinyl)imino]-1,6-hexanediyl[2,2,6,6-tetramethyl-4-piperidinyl)imino]] (base 1), corresponding to 0.5%, are mixed in a turbomixer with 1192.8 g of polypropylene powder (Basell Moplen HP500H) having a melt index of 1.8 (measured at 230° C. and 2.16 Kg).

Formulation 8: a comparison formulation is prepared in the same manner as above, is the same as formulation 7, but without base 1.

The mixtures are extruded at 190-230° C. using a lab-scale twin-screw extruder (OMC, Ø 19 mm, L/D=25) to give polymer granules which are subsequently converted into plaques 2 mm thick, using an injection-molding machine (Negri Bossi, Ø 28 mm, L/D=22), operating at a maximum temperature of 230° C.

In order to induce a color change the plaques thus prepared are dipped into a silicon oil bath at 140° C., which is above the temperature of color switching. The change in color is assessed visually and reported in the table below:

| Formulation | Visual color | |
| --- | --- | --- |
| | At r.t. | At T = 140° C. |
| 7 | Orange | Pale yellow |
| 8 | Pale yellow | Pale yellow |

Formulation 8 has visually the same color as formulation 7 at 140° C., thus the colorimetric data of the two formulations can be compared in order to quantify the color change due to the thermochromic effect. The values are determined using a Minolta colorimeter CM-508d considering the CIEL*a*b* colorimetric space. The relevant values are reported in the table below:

| Formulation | L* at r.t. | a* at r.t. | b* at r.t. |
| --- | --- | --- | --- |
| 7 | 67.95 | 21.07 | 71.27 |
| 8 | 75.62 | −8.94 | 36.52 |

The large differences of the colorimetric values between formulations 7 and 8 respectively show how efficiently the color of the plaques changes with temperature. Finally formulations 7 and 8 are subjected to the experiment described in Example 2, with the difference that the silicon oil bath is kept at 120° C. In this way a whole thermochromic cycle is achieved, with the plaques showing the color change after several cycles.

What is claimed:

1. A reversible thermochromic system comprising
(a) a β-phenylvinylketone or a ω-phenyl polyacetylenyl ketone containing at least one acidic hydrogen and
(b) a base;
with the proviso that the system is free of thymol blue and phthalein derivatives,
wherein component (a) is a compound of formula (I),

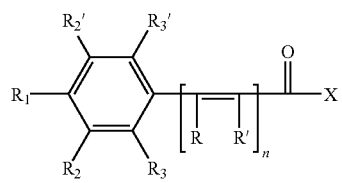

wherein
X is

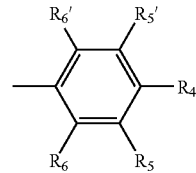

or $CHR_7$—$CO$—$R_8$; or X is $C_1$-$C_{30}$alkyl, $C_2$-$C_{30}$alkenyl, $C_2$-$C_{30}$alkinyl, $C_7$-$C_{12}$aryl, $C_7$-$C_{12}$aralkyl, $C_8$-$C_{12}$aralkenyl or $C_8$-$C_{12}$aralkynyl, each of which is unsubstituted or substituted;

n is an integer from 1 to 10;

R and R' are independently hydrogen, $C_1$-$C_{30}$alkyl, $C_2$-$C_{30}$alkenyl, $C_2$-$C_{30}$alkynyl, $C_6$-$C_{12}$aryl, $C_7$-$C_{12}$aralkyl, $C_8$-$C_{12}$aralkenyl or $C_8$-$C_{12}$aralkynyl;

$R_1$, $R_2$, $R_2'$, $R_3$, $R_3'$, $R_4$, $R_5$, $R_5'$, $R_6$ and $R_6'$ are independently hydrogen, hydroxy, $C_1$-$C_{30}$alkyl, $C_2$-$C_{30}$alkenyl, $C_2$-$C_{30}$alkynyl, $C_6$-$C_{12}$aryl, $C_7$-$C_{12}$aralkyl, $C_8$-$C_{12}$aralkenyl, $C_8$-$C_{12}$aralkynyl, halogen, $NO_2$, CN, $NR_9R_{10}$, $OR_{11}$, $SR_{11}$, $S(=O)R_{11}$, $S(=O)_2R_{11}$, $CO$—$R_{11}$, $CO$—$O$—$R_{11}$, $O$—$CO$—$R_{11}$, $CO$—$NR_9R_{10}$ or $NR_9$—$CO$—$R_{11}$, whereby the alkyl, alkenyl, alkynyl, aryl, aralkyl, aralkenyl and aralkynyl are substituted or unsubstituted;

$R_7$, $R_9$ and $R_{10}$ are independently hydrogen or as defined for $R_8$;

$R_8$ and $R_{11}$ are independently $C_1$-$C_{30}$alkyl, $C_2$-$C_{30}$alkenyl, $C_2$-$C_{30}$alkynyl, $C_6$-$C_{10}$aryl, $C_7$-$C_{12}$aralkyl, $C_8$-$C_{12}$aralkenyl or $C_8$-$C_{12}$aralkynyl, whereby the alkyl, alkenyl, alkynyl, aryl, aralkyl, aralkenyl and aralkynyl are substituted or unsubstituted;

the substituted alkyl, alkenyl, alkynyl, aryl, aralkyl, aralkenyl and aralkynyl are substituted by halogen, hydroxy, $NO_2$, CN, $CO$—$R_{12}$, $COO$—$R_{12}$, $CONR_{13}R_{14}$, $OCO$—$R_{12}$, $NR_{13}CO$—$R_{12}$, $NR_{13}R_{14}$, $O$—$R_{12}$, $S$—$R_{12}$, $S(=O)$—$R_{12}$ and/or $S(=O)_2$—$R_{12}$; or the substituted aryl, aralkyl, aralkenyl and aralkynyl are substituted by $C_1$-$C_{30}$alkyl, $C_2$-$C_{30}$alkenyl and/or $C_2$-$C_{30}$alkynyl;

$R_{12}$ is independently $C_1$-$C_{30}$-alkyl, $C_2$-$C_{30}$alkenyl, $C_2$-$C_{30}$alkynyl, $C_6$-$C_{12}$aryl, $C_7$-$C_{12}$aralkyl, $C_8$-$C_{12}$aralkenyl or $C_8$-$C_{12}$aralkynyl; and $R_{13}$ and $R_{14}$ are independently hydrogen or as defined for $R_{12}$; and wherein $R_1$ and/or $R_4$ are hydroxy and wherein component (b) is a secondary or tertiary amine or a secondary or tertiary phosphine of formula $NHR_{26}R_{27}$, $NR_{26}R_{27}R_{28}$, $PHR_{26}R_{27}$ or $PR_{26}R_{27}R_{28}$ wherein $R_{26}$, $R_{27}$ and $R_{28}$ are independently $C_1$-$C_{30}$alkyl, $C_7$-$C_{12}$aralkyl, $C_2$-$C_{30}$alkenyl, $C_8$-$C_{12}$aralkenyl, $C_2$-$C_{30}$alkynyl or $C_8$-$C_{12}$aralkynyl, which are unsubstituted or substituted by one or more $COO$—$R_{13}$, $CONR_{13}R_{14}$, $OCO$—$R_{12}$, $NR_{13}CO$—$R_{12}$, $NR_{12}R_{13}$, $O$—$R_{12}$, $S$—$R_{12}$, $SO$—$R_{12}$ and/or $S(=O)_2$—$R_{12}$; or the aralkyl, aralkenyl and aralkynyl are substituted by $C_1$-$C_{30}$alkyl, $C_2$-$C_{30}$alkenyl and/or $C_2$-$C_{30}$alkynyl, where $R_{12}$ is $C_1$-$C_{30}$alkyl, $C_2$-$C_{30}$alkenyl, $C_2$-$C_{30}$alkynyl, $C_6$-$C_{10}$aryl, $C_7$-$C_{12}$aralkyl, $C_8$-$C_{12}$aralkenyl or $C_8$-$C_{12}$aralkynyl and $R_{13}$ and $R_{14}$ are independently hydrogen or as defined for $R_{12}$ or wherein component (b) is a secondary or tertiary sterically hindered amine of formula (Z)

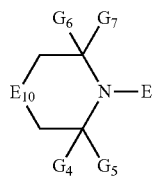

(Z)

wherein $G_4$, $G_5$, $G_6$ and $G_7$ are independently methyl or ethyl,

E is hydrogen, $C_1$-$C_{18}$alkyl or $C_3$-$C_{18}$alkenyl and $E_{10}$ is a carbon atom which is unsubstituted or substituted by OH, =O or by one or two organic residues containing in total 1-500 carbon atoms or 1-500 carbon atoms and 1-200 heteroatoms, wherein the component (b) has a molecular weight of at least 150 g per mole.

2. The reversible thermochromic system according to claim 1, wherein

X is

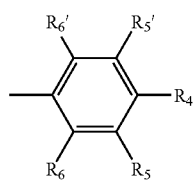

or $CHR_7$—CO—$R_8$; or X is $C_1$-$C_{30}$alkyl, $C_2$-$C_{30}$alkenyl, $C_2$-$C_{30}$alkinyl, $C_7$-$C_{12}$aryl, $C_7C_{12}$aralkyl, $C_8$-$C_{12}$aralkenyl or $C_8$-$C_{12}$aralkynyl, each of which is unsubstituted or substituted;

n is an integer from 1 to 2;

R and R' are independently hydrogen or $C_1$-$C_{30}$alkyl;

$R_1$, $R_2$, $R_2'$, $R_3$, $R_3'$, $R_4$, $R_5$, $R_5'$, $R_6$ and $R_6'$ are independently hydrogen, hydroxy, $C_1$-$C_{30}$alkyl, $C_2$-$C_{30}$alkenyl, $C_2$-$C_{30}$alkynyl, $C_6$-$C_{12}$aryl, $C_7C_{12}$aralkyl, $C_8$-$C_{12}$aralkenyl, $C_8$-$C_{12}$aralkynyl, halogen, $NO_2$, $NR_9R_{10}$, $OR_{11}$, CO—$R_{11}$, CO—O—$R_{11}$, O—CO—$R_{11}$, CO—$NR_9R_{10}$ or $NR_9$—CO—$R_{11}$, whereby the alkyl, alkenyl, alkynyl, aryl, aralkyl, aralkenyl and aralkynyl are substituted or unsubstituted;

$R_7$, $R_9$ and $R_{10}$ are independently hydrogen or as defined for $R_8$;

$R_8$ and $R_{11}$ are independently $C_1$-$C_{30}$alkyl, $C_2$-$C_{30}$alkenyl, $C_2$-$C_{30}$alkynyl, $C_6$-$C_{10}$aryl, $C_7$-$C_{12}$aralkyl, $C_8$-$C_{12}$aralkenyl or $C_8$-$C_{12}$aralkynyl, whereby the alkyl, alkenyl, alkynyl, aryl, aralkyl, aralkenyl and aralkynyl are substituted or unsubstituted;

the substituted alkyl, alkenyl, alkynyl, aryl, aralkyl, aralkenyl and aralkynyl are substituted by halogen, hydroxy, $NO_2$, CO—$R_{12}$, COO—$R_{12}$, $CONR_{13}R_{14}$, OCO—$R_{12}$, $NR_{13}CO$—$R_{12}$, $NR_{13}R_{14}$ and/or O—$R_{12}$; or the substituted aryl, aralkyl, aralkenyl and aralkynyl are substituted by $C_1$-$C_{30}$alkyl, $C_2$-$C_{30}$alkenyl and/or $C_2$-$C_{30}$alkynyl;

$R_{12}$ is independently $C_1$-$C_{30}$-alkyl, $C_2$-$C_{30}$alkenyl, $C_2$-$C_{30}$alkynyl, $C_6$-$C_{12}$aryl, $C_7$-$C_{12}$aralkyl, $C_8$-$C_{12}$aralkenyl or $C_8$-$C_{12}$aralkynyl; and $R_{13}$ and $R_{14}$ are independently hydrogen or as defined for $R_{12}$.

3. The reversible thermochromic system according to claim 1, wherein

X is

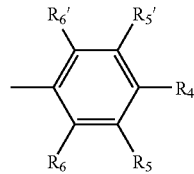

or $CHR_7$—CO—$R_8$; or X is $C_1$-$C_5$alkyl or naphthyl; or X is substituted $C_8$aralkenyl;

n is 1;

R and R' are hydrogen;

$R_1$, $R_2$, $R_2'$, $R_3$, $R_3'$, $R_4$, $R_5$, $R_5'$, $R_6$ and $R_6'$ are independently hydrogen, hydroxy, halogen, $NO_2$, $NR_9R_{10}$, $OR_{11}$ or CO—$R_{11}$;

$R_7$ is hydrogen;

$R_9$ and $R_{10}$ are independently hydrogen or as defined for $R_8$;

$R_8$ and $R_{11}$ are independently $C_1$-$C_5$alkyl or $C_8$aralkenyl, whereby the alkyl and aralkenyl are substituted or unsubstituted;

the substituted alkyl, aryl and aralkenyl are substituted by hydroxy, $NO_2$ and/or O—$R_{12}$; and $R_{12}$ is $C_1$-$C_8$alkyl.

4. The reversible thermochromic system according to claim 1, wherein

X is

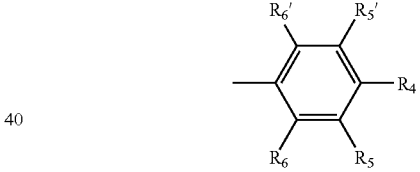

or $CHR_7$—CO—$R_8$; or X is methyl or naphthyl; or X is substituted $C_8$aralkenyl;

n is 1;

R and R' are hydrogen;

$R_1$, $R_2$, $R_2'$, $R_4$, $R_5$ and $R_5'$ are independently hydrogen, hydroxy, chlorine, $NO_2$, $NR_9R_{10}$, $OR_{11}$ or CO—$R_{11}$;

$R_3$, $R_3'$, $R_6$ and $R_6'$ are hydrogen;

$R_7$ is H;

$R_9$ and $R_{10}$ are independently as defined for $R_8$;

$R_8$ and $R_{11}$ are independently methyl or substituted $C_8$aralkenyl;

the substituted aralkenyl is substituted by hydroxy, $NO_2$ and/or O—$R_{12}$; and $R_{12}$ is methyl.

5. The reversible thermochromic system according to claim 1, wherein the component (b) is a secondary or tertiary amine or a secondary or tertiary phosphine of formula $NHR_{26}R_{27}$, $NR_{26}R_{27}R_{28}$, $PHR_{26}R_{27}$ or $PR_{26}R_{27}R_{28}$ wherein said amine and said phosphine are not aromatic and do not have aromatic substituents that are directly connected to said amine or said phosphine.

6. The reversible thermochromic system according to claim 1, wherein the component (b) is a secondary sterically hindered amine, wherein E is hydrogen.

7. The reversible thermochromic system according to claim 1, wherein a ratio of component (a) to component (b) is 2:1 to 1:100 by weight.

8. The reversible thermochromic system according to claim 1, wherein a ratio of component (a) to component (b) is 1:3 to 1:6 by weight.

9. The reversible thermochromic system according to claim 1, containing additionally (ii) a carrier material.

10. The reversible thermochromic system according to claim 1, containing additionally (ii) a carrier material; a ratio of the sum of components (a) and (b) to component (ii) being 1:1000 to 1:5 by weight.

* * * * *